(12) United States Patent
Wang et al.

(10) Patent No.: US 10,565,463 B2
(45) Date of Patent: Feb. 18, 2020

(54) ADVANCED SIGNALING OF A MOST-INTERESTED REGION IN AN IMAGE

(71) Applicant: QUALCOMM Incorporated, San Diego, CA (US)

(72) Inventors: Ye-Kui Wang, San Diego, CA (US); Fnu Hendry, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 199 days.

(21) Appl. No.: 15/591,805

(22) Filed: May 10, 2017

(65) Prior Publication Data

US 2017/0344843 A1    Nov. 30, 2017

Related U.S. Application Data

(60) Provisional application No. 62/341,017, filed on May 24, 2016.

(51) Int. Cl.
| | |
|---|---|
| *G06K 9/32* | (2006.01) |
| *H04N 21/854* | (2011.01) |
| *H04N 21/235* | (2011.01) |
| *H04N 21/4728* | (2011.01) |
| *H04N 19/167* | (2014.01) |
| *H04N 19/70* | (2014.01) |

(Continued)

(52) U.S. Cl.
CPC ....... *G06K 9/3233* (2013.01); *G06K 9/00744* (2013.01); *H04N 19/167* (2014.11); *H04N 19/70* (2014.11); *H04N 21/2353* (2013.01); *H04N 21/4728* (2013.01); *H04N 21/85406* (2013.01); *H04N 21/234327* (2013.01); *H04N 21/234345* (2013.01); *H04N 21/440227* (2013.01); *H04N 21/440245* (2013.01); *H04N 21/8456* (2013.01)

(58) Field of Classification Search
CPC ..... H04N 21/234345; H04N 21/85406; H04N 21/234327; H04N 21/2353; H04N 21/440245; H04N 21/440227; H04N 19/167; G06K 9/00744; G06K 9/3233
USPC ........................................................ 382/195
See application file for complete search history.

(56) References Cited

U.S. PATENT DOCUMENTS

| | | |
|---|---|---|
| 2003/0163781 A1 | 8/2003 | Visharam et al. |
| 2014/0082054 A1 | 3/2014 | Denoual et al. |

(Continued)

FOREIGN PATENT DOCUMENTS

WO    2015014773 A1    2/2015

OTHER PUBLICATIONS

Invitation to Restrict or Pay Additional Fees—PCT/US2017/032185—IPEA/EPO—Jan. 31, 2018 (12 pages).

(Continued)

*Primary Examiner* — Daniel G Mariam
(74) *Attorney, Agent, or Firm* — Shumaker & Sieffert, P.A.

(57) ABSTRACT

A device for determining information for video data includes one or more processors implemented in circuitry that are configured to determine one or more most-interested regions of a plurality of regions of an image of video data from data representative of the one or more most-interested regions. The one or more processors are further configured to generate a request specifying the one or more most-interested regions using the data representative of the one or more most-interested regions and output the request to a server device.

56 Claims, 7 Drawing Sheets

(51) Int. Cl.
*G06K 9/00* (2006.01)
*H04N 21/2343* (2011.01)
*H04N 21/845* (2011.01)
*H04N 21/4402* (2011.01)

(56) References Cited

U.S. PATENT DOCUMENTS

2015/0016504 A1  1/2015  Auyeung et al.
2017/0118540 A1* 4/2017  Thomas ........... H04N 21/85406
2017/0251204 A1  8/2017  Gupte et al.

OTHER PUBLICATIONS

Reply to Written Opinion from corresponding PCT Application Serial No. PCT/US2017/032185 filed on Oct. 16, 2017, (39 pages).
Second Written Opinion from corresponding PCT Application Serial No. PCT/US2017/032185 dated Apr. 9, 2018, (12 pages).
International Preliminary Report on Patentability from corresponding PCT Application Serial No. PCT/US2017/032185 dated Jul. 5, 2018 (38 pp).
International Search Report and Written Opinion—PCT/US2017/032185—ISA/EPO—dated Aug. 23, 2017 (25 pages).
"ITU-T H.264, Advanced Video Coding for Generic Audiovisual Services, Series H: Audiovisual and Multimedia Systems, Infrastructure of Audiovisual Services—Coding of Moving Video", Telecommunication Standardization Sector of ITU, Apr. 1, 2013, XP055232958, Retrieved from the Internet: http://www.itu.int/ITU-T/recommendations/rec.aspx?rec=11830&lang=en [retrieved on Dec. 2, 2015], 732 pages.
Mavlankar A., et al., "An Interactive Region-of-Interest Video Streaming System for Online Lecture Viewing", Packet Video Workshop, IEEE, Dec. 13, 2010, XP031899005, DOI: 10.1109/PV.2010.5706821, ISBN: 978-1-4244-9522-1, pp. 64-71.
Partial International Search Report—PCT/US2017/032185—ISA/EPO—dated Jul. 14, 2017 (18 pages).
Tripathi S., "ROI based Parametric Video Coding Scheme", Jul. 1, 2011, XP055388644, pp. 89-96, Retrieved from the Internet: URL:http://acsweb.ucsd.edu/~stripath/publications/Region_of_Interest_based_Parametric_Vide.pdf [retrieved on Jul. 6, 2017].
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 1, 2012 (Apr. 1, 2012), pp. I-VI, 1-126, XP002712145, paragraph A.7-A.9 paragraph [OA.4].
Fielding, et al., "Hypertext Transfer Protocol—HTTP/1.1," Network Working Group, RFC 2616, Jun. 1999, 200 pp.
"Text of ISO/IEC 14496-15 2nd edition", MPEG Meeting; Jan. 18, 2010-Jan. 22, 2010; Kyoto; (Motion Picture Expertgroup or ISO/IEC JTC1/SC29/WG11),, No. N11139, Jan. 22, 2010, ISSN: 0000-0030, 95 pp.
U.S. Appl. No. 15/589,782, filed by Wang et al., filed May 8, 2017.

* cited by examiner

ADVANCED SIGNALING OF A MOST-INTERESTED REGION IN AN IMAGE

This application claims the benefit of U.S. Provisional Application No. 62/341,017, filed May 24, 2016, which is hereby incorporated by reference in its entirety.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks or coding tree units (CTUs). In the remainder of this document, the two terms macroblocks and CTUs are used interchangeably. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as the AVC file format.

After the video data has been packetized for transmission or storage, a client device may request the packetized video data at a suitable quality. For example, the client device may request the packetized video data at a relatively high-quality when a bandwidth between the client device and a digital video device transmitting the packetized video is high and request the packetized video data at a relatively low-quality when a bandwidth between the client device and a digital video device transmitting the packetized video is low.

SUMMARY

In general, this disclosure describes techniques for generating and consuming a bitstream that includes data representative of one or more most-interested regions of an image of video data. These techniques may be particularly applicable to situations in which only part of an image is presented to a user, because the user's field of view (FOV) is smaller than the entire image. For example, these techniques may be applied to virtual reality (VR) scenarios. Thus, only part of the image may be presented to the user, e.g., by way of a VR headset. The user's FOV may partially or fully overlap one or more of the most-interested regions of the image. Thus, the phrase "most-interested regions of an image" generally refers to regions of the image that are more likely to be presented to the user at the presentation time of the image compared to the other regions of the image. A device may use the one or more most-interested regions to pre-fetch video data for the one or more most-interested regions such that, for example, the device requests video data for the one or more most-interested regions before requesting video data for the other regions of the image, where the device may either be the entity that contains the video decoder or be a network element such as a content delivery network (CDN) node.

In one example, a method of determining information for video data includes determining, by a processor of a device, the processor implemented in circuitry, one or more most-interested regions of a plurality of regions of an image of video data from data representative of the one or more most-interested regions, generating, by the processor, a request specifying the one or more most-interested regions using the data representative of the one or more most-interested regions, and outputting, by the processor, the request to a server device.

In another example, a device for determining information for video data includes one or more processors implemented in circuitry that are configured to determine one or more most-interested regions of a plurality of regions of an image of video data from data representative of the one or more most-interested regions, generate a request specifying the one or more most-interested regions using the data representative of the one or more most-interested regions, and output the request to a server device.

In another example, a device for determining information for video data includes means for means for determining one or more most-interested regions of a plurality of regions of an image of video data from data representative of the one or more most-interested regions, means generating a request specifying the one or more most-interested regions using the data representative of the one or more most-interested regions, and means for outputting the request to a server device.

In another example, a computer program product includes a computer-readable storage medium comprises instructions that, when executed, cause a processor to determine one or more most-interested regions of a plurality of regions of an image of video data from data representative of the one or more most-interested regions, generate a request specifying the one or more most-interested regions using the data representative of the one or more most-interested regions, and output the request to a server device.

In another example, a method of signaling information for video data includes determining, by a processor of a source device, the processor implemented in circuitry, one or more most-interested regions of a plurality of regions of an image of video data. The one or more most-interested regions comprising one or more regions that are most likely to be retrieved by a client device. The method further includes outputting, by the processor, data representative of the one or more most-interested regions. The data representative of the one or more most-interested regions is included in a bitstream including the video data. The method further includes outputting, by the processor, after outputting the data representative of the one or more most interested regions, the video data.

In another example, a device for signaling information for video data includes one or more processors implemented in circuitry that are configured to determine one or more most-interested regions of a plurality of regions of an image of video data. The one or more most-interested regions comprising one or more regions that are most likely to be retrieved by a client device. The one or more processors are further configured to output data representative of the one or more most-interested regions. The data representative of the one or more most-interested regions is included in a bitstream including the video data. The one or more processors are further configured to output, after outputting the data representative of the one or more most interested regions, the video data.

In another example, a device for signaling information for video data includes means for determining one or more most-interested regions of a plurality of regions of an image of video data. The one or more most-interested regions comprising one or more regions that are most likely to be retrieved by a client device. The device further including means for outputting data representative of the one or more most-interested regions. The data representative of the one or more most-interested regions is included in a bitstream including the video data. The device further including means for outputting, after outputting the data representative of the one or more most interested regions, the video data.

In another example, a computer program product includes a computer-readable storage medium comprises instructions that cause a processor to determine one or more most-interested regions of a plurality of regions of an image of video data. The one or more most-interested regions comprising one or more regions that are most likely to be retrieved by a client device. The instructions further cause the processor to output data representative of the one or more most-interested regions. The data representative of the one or more most-interested regions is included in a bitstream including the video data. The instructions further cause the processor to output, after outputting the data representative of the one or more most interested regions, the video data.

The details of one or more examples are set forth in the accompanying drawings and the description below. Other features, objects, and advantages will be apparent from the description and drawings, and from the claims.

DETAILED DESCRIPTION

Figure 1:
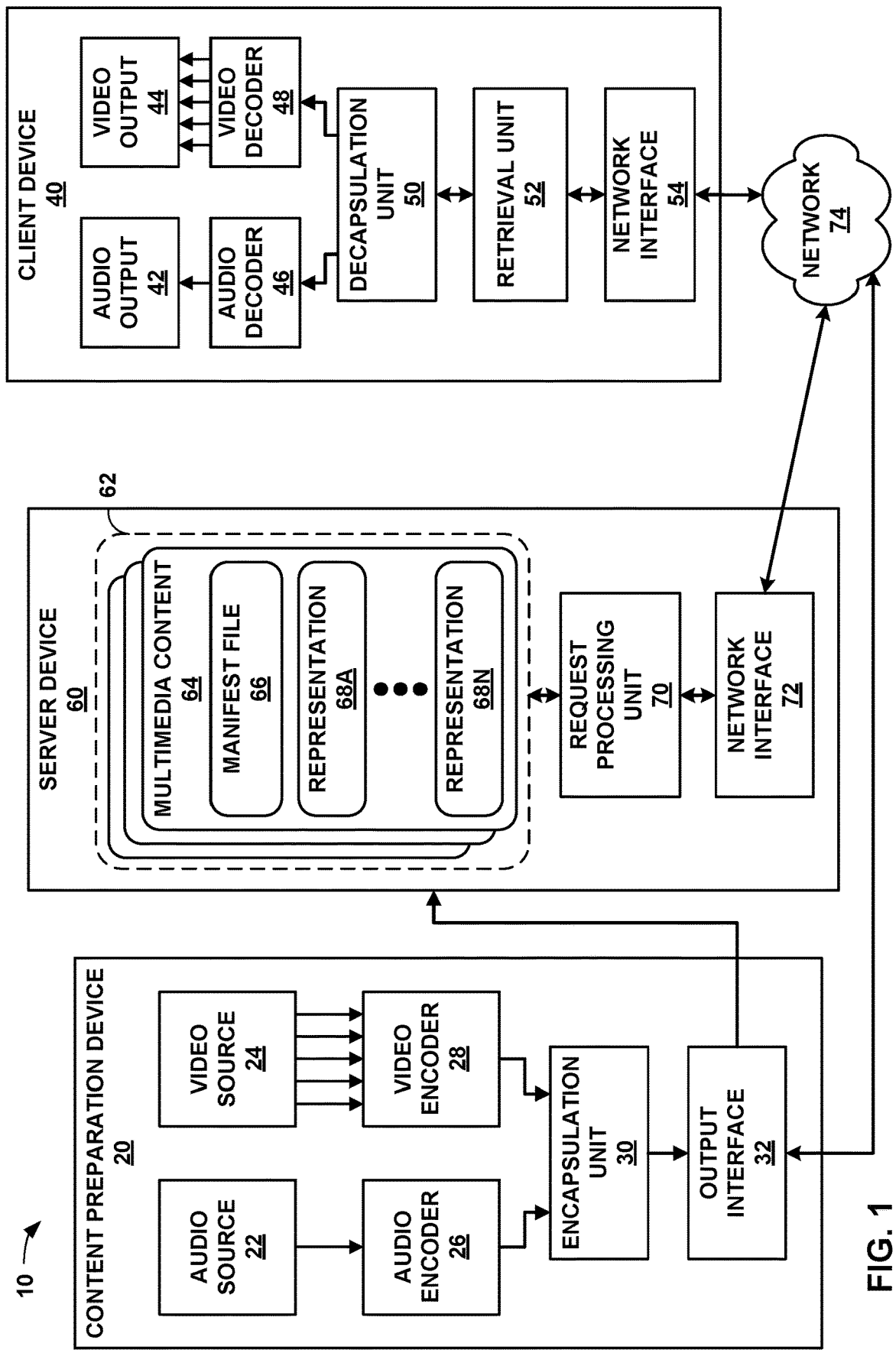
FIG. 1 is a block diagram illustrating an example system that implements techniques for streaming media data over a network.

This invention relates to virtual reality (VR). More specifically, this invention discloses some methods for creation of a set of one or more most-interested regions in VR video, signaling of information of most-interested regions, and use of the information in encoding, streaming, playback, and management of VR video content.

In general, this disclosure describes techniques for generating a video content that includes data representative of one or more most-interested regions of an image of video data. A director or producer may select the one or more most-interested regions or a computing device may derive the one or more most-interested regions from user statistics by a service or content provider, e.g., through the statistics of which regions have been requested/seen the most by users when the omnidirectional video content was provided through a streaming service. In any case, a client device may use the one or more most-interested regions to pre-fetch video data for the one or more most-interested regions to improve a playback of a video, such as, a virtual reality video, which is also referred to as 360 video.

Specifically, a client device may determine, for example, using information received in a header or message for transmitting video coding layer data of a bitstream, data representative of the one or more most-interested regions. Upon determining the one or more most-interested regions from the data representative of the one or more most-interested regions, the client device may generate a request specifying the one or more most-interested regions. After requesting the one or more most-interested regions, the client device may request one or more other regions of the image using a user's field of view (FOV). In this manner, video data for the one or more most-interested regions may be pre-fetched (e.g., requested prior to receiving the FOV of the user), thereby improving a playback of a video, such as, a virtual reality video.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The techniques of this disclosure may be applied to an environment for streaming the media data, such as a dynamic adaptive streaming over HTTP (DASH) environment. These techniques may be used to support HTTP Live Streaming (HLS) or other live streaming services. Although generally discussed with respect to DASH and HLS, the techniques of this disclosure may be applicable to other network streaming protocols. DASH is specified in ISO/IEC 23009-1:2012, "Information technology—Dynamic adaptive streaming over HTTP (DASH)—Part 1: Media presentation description and segment formats," Apr. 1, 2012, available at http://standards.iso.org/ittf/PubliclyAvailableStandards/c057623_ISO_IEC_23009-1_2012.zip.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile idc (profile indicator) value, while a level may be signaled with a level idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units (e.g., VCL data) and non-VCL NAL units. VCL units (also referred to as VCL data) may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and Supplemental Enhancement Information (SEI) NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

SEI messages may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC), multiview extension (i.e., multiview high efficiency video coding, MV-HEVC), and 3D extension (i.e., 3D high efficiency video coding, 3D-HEVC).

Encapsulation unit 30 may determine one or more most-interested regions of an image. As used herein, a most-interested region may refer to a region of an image that has a high likelihood of being viewed by a user. For example, a most-interested region may refer to a region of an image that is selected by a director or producer. In some examples, a most-interested region may refer to a region of an image that is derived by a computing device from user statistics by a service or content provider, e.g., through the statistics of which regions have been requested/seen the most by users when the omnidirectional video content was provided through a streaming service.

Encapsulation unit 30 may encapsulate data representative of one or more most-interested regions. In some examples, encapsulation unit 30 may encapsulate the data representative of one or more most-interested regions. For example, encapsulation unit 30 may encapsulate a SEI message that includes the data representative of one or more most-interested regions. In some examples, encapsulation unit 30 may encapsulate a file format data that includes the data representative of one or more most-interested regions. For instance, encapsulation unit 30 may encapsulate a box (e.g., a sample group box, a sample table box, a track fragment, a segment index box, etc.) that includes the data representative of one or more most-interested regions.

Encapsulation unit 30 may encapsulate data representative of one or more most-interested regions such that the data representative of the one or more most-interested regions in included in a bitstream including video data for the one or more most interested regions. For example, encapsulation unit 30 may encapsulate data representative of one or more most-interested regions for a particular image in file format data prior to outputting video data for the particular image. In this example, after encapsulating data representative of one or more most-interested regions for the particular image in file format data, encapsulation unit 30 may encapsulate video data for the particular image.

The generation and use of information on most-interested regions will now be discussed. U.S. Provisional Application 62/339,009, filed 19 May 2016, incorporated herein by reference in its entirety, discloses generation of information on most-interested regions by user statistics by a service or content provider, e.g., through the statistics of which regions have been requested/seen the most by users when the VR video content was provided through a streaming service, wherein a most-interested region in a VR video picture is one of the regions that are statistically most likely rendered to the user at the presentation time of the picture. Also disclosed in U.S. Provisional Application 62/339,009 is the use of information on most-interested regions for various VR performance-improving purposes, such as data pre-fetching in VR adaptive streaming by edge servers or clients, transcoding optimization when a VR video is transcoded, e.g., to a different codec or projection mapping, cache management by an edge server or cache, and content management by a VR video streaming server. Signaling of most-interested regions has also been disclosed, e.g., by using SEI messages in a video bitstream, a file format sample group in a media file, or dynamic adaptive streaming over HTTP (DASH) media presentation description (MPD) elements or attributes using a sample group.

With respect to VR video applications, when considering ways to utilize information on most-interested regions, we identify at least some of the following problems. As one example, no mechanism was available to ensure that information on most-interested regions of VR video can be received by an adaptive streaming client or edge server before the video pictures that the information is about. When included in an SEI message, as described in U.S. Provisional Application 62/339,009, the information would come together with the coded pictures the information is about. When included in a track fragment, a file format sample group describes information about the video samples in that track fragment. As another example, in some cases, e.g., when tile tracks are used for carrying motion-constrained tiles or tile regions, it is not necessary to signal information on most-interested regions through the positions and sizes of the regions, but rather simpler and more efficient signaling can be used.

This disclosure describes several techniques for advanced signaling of one or more most-interested region in VR video, such that information on most-interested regions of VR video can be received by an adaptive streaming client or edge server before the video pictures that the information is about. Said differently, advanced signaling of one or more most-interested region in VR video may permit information on most-interested regions of VR video to be received in a data set that is different than a data set that includes the video data for the one or more most-interested regions. One or more of these techniques may be applied independently, or in combination with others.

In one example, it is proposed that a sample group, when included in a track fragment box, can document information of samples that are in subsequent track fragments following the one that contains the sample group (the SampleToGroupBox of the grouping type and the corresponding sample group description box) in the track. For example, a new version of the SampleToGroupBox is defined, and when the SampleToGroupBox of a particular grouping type is included in a track fragment, it is required that the new version of the SampleToGroupBox is used, and the information included in the corresponding sample group entry of the same grouping type can document information of samples in subsequent track fragments that contains the sample group in the track.

In another example, the sample group for describing the most-interested region may at least contain one or more of the following syntax elements.

The sample group may contain a syntax element indicating the number of most-interested regions.

The sample group may contain a loop of a set of syntax elements, each set describing the position and size of a most-interested region. For example, each set may include four syntax elements indicating the up, bottom, left and right offsets, in number of luma samples in relative to the full picture, of the four corners of a rectangle that is a most-interested region. For each of the most-interested region, a priority may be indicated by a syntax element, with a high priority indicating a higher interest of the region.

In one example, each set may include two syntax elements indicating the coordinate, in number of luma samples in relative to the full picture, of the upper-left corner of a rectangle that is a most-interested region, and two syntax elements indicating the width and height of the rectangle.

In the second example, each set may include two syntax elements indicating the coordinate, in number of luma samples in relative to the full picture, of the upper-left corner of a most-interested region. Note that the most-interested region pointed by such coordinate may not be of rectangle shape. File parsers should be able to associate the coordinate with a region in a viewport and find the track/DASH representation in which such region is coded with the highest resolution/quality.

In the third example, the first and the second alternative can be merged in which a flag is introduced to indicate whether the most-interested region is of rectangle shape which is described by width and height.

In the fourth example, each set may include three syntax elements (e.g., the yaw degree, pitch degree and radius length) indicating the coordinate, in number of luma samples in relative to the sphere, of the upper-left corner of a rectangle that is a most-interested region, and two syntax elements indicating the width of pitch and height yaw of the rectangle. File parsers should be able to associate the described region in sphere with region in relative to the full picture and find the track/DASH representation in which such region is coded with the highest resolution/quality.

In another example, instead of directly signal the position and size of a most-interested region, the tile IDs, as specified in the HEVC specification, of the tiles covering a most-interested region may be signalled.

In another example, instead of directly signal the position and size of a most-interested region, the tile region IDs or group IDs, as defined in clause 10 of ISO/IEC 14496-15, of the tile regions covering a most-interested region may be signalled.

In another example, when tile tracks as defined in clause 10 of ISO/IEC 14496-15 are used, instead of directly signal the position and size of a most-interested region, the track IDs of the tracks carrying the motion-constrained tiles or tile regions that cover a most-interested region may be signalled.

In another example when DASH is used for streaming the VR video, tile tracks as defined in clause 10 of ISO/IEC 14496-15 are used, and each tile track is encapsulated in one DASH representation, instead of directly signal the position and size of a most-interested region, in the MPD or an update of the MPD, the representation IDs of the representations corresponding to the tracks carrying the motion-constrained tiles or tile regions that cover a most-interested region may be signalled.

In another example, when tile tracks as defined in defined in clause 10 of ISO/IEC 14496-15 are used, the information of the one or more most-interested regions may be signalled in the base tile track or non-tiled track (i.e., the track that is referred to by other tracks through 'TBAS' track reference), or may be signalled only in the base tile track. In this case, when a sample group is used for the signaling, the sample numbers are those of the tile tracks associated with the current track. And in this case, it may be required that the number of samples the tile tracks are the same, and the sample numbers of the tile tracks are aligned.

In another example, instead of using a sample group, the information of most-interested regions may also be signalled in new box that is included, directly or indirectly, in the sample table box, the track fragment box, and/or the segment index box, and it is allowed for the new box to document information about samples of subsequent track fragments or subsequent segments following the one that contains the new box in the track.

In another example, the information on most-interested regions for a particular set of pictures of a VR video bitstream may be signalled using an SEI message. An instance of this SEI message is specified to be applicable to the set of (one or more) pictures by syntax, semantics or both. The SEI message may contain one or more of the following syntax elements.

The SEI message may contain a syntax element indicating the number of most-interested regions.

The SEI message may contain a loop of a set of syntax elements, each set describing the position and size of a most-interested region. For example, each set may include four syntax element indicating the up, bottom, left and right offsets, in number of luma samples in relative to the full picture, of the four corners of a rectangle that is a most-interested region. Alternatively, each set may include two syntax element indicating the coordinate, in number of luma samples in relative to the full picture, of the upper-left corner of a rectangle that is a most-interested region, and two syntax elements indicating the width and height of the rectangle.

The SEI message may contain, for each of the most-interested region, a priority may be indicated by a syntax element, with a high priority indicating a higher interest of the region.

The SEI message may contain a syntax element indicating whether to cancel the effect of all earlier instances of this SEI message in decoding order.

The SEI message may contain a syntax element indicating a future picture or access unit in output order, from which the information on most-interested regions described by this SEI message starts to apply. This indication can be implemented as a delta POC (picture order count), that is relative to the POC of the picture or access unit associated with the SEI message, or a delta of the output time.

The SEI message may contain a syntax element indicating whether the information in the current instances of this SEI message persists until the next picture in output order, or the start of a new coded video sequence, or the end of the bitstream.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment. In some examples, manifest file 66 may include data representative of one or more most-interested regions in a particular image, per techniques of this disclosure.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In this manner, content preparation device 20 represents an example of a device for signaling information for video data, the device including a processor configured to determine one or more most-interested regions of a plurality of regions of an image of video data. The one or more most-interested regions comprising one or more regions that are most likely to be retrieved by a client device. The processor is further configured to output data representative of the one or more most-interested regions. The data representative of the one or more most-interested regions is included in a bitstream including the video data. The processor is further configured to output, after outputting the data representative of the one or more most interested regions, the video data.

Additionally, client device 40 represents an example of a device for determining information for video data, the device including a processor configured to determine one or more most-interested regions of a plurality of regions of an image of video data from data representative of the one or more most-interested regions. The processor is further configured to generate a request specifying the one or more most-interested regions using the data representative of the one or more most-interested regions and output the request to a server device.

Figure 2:
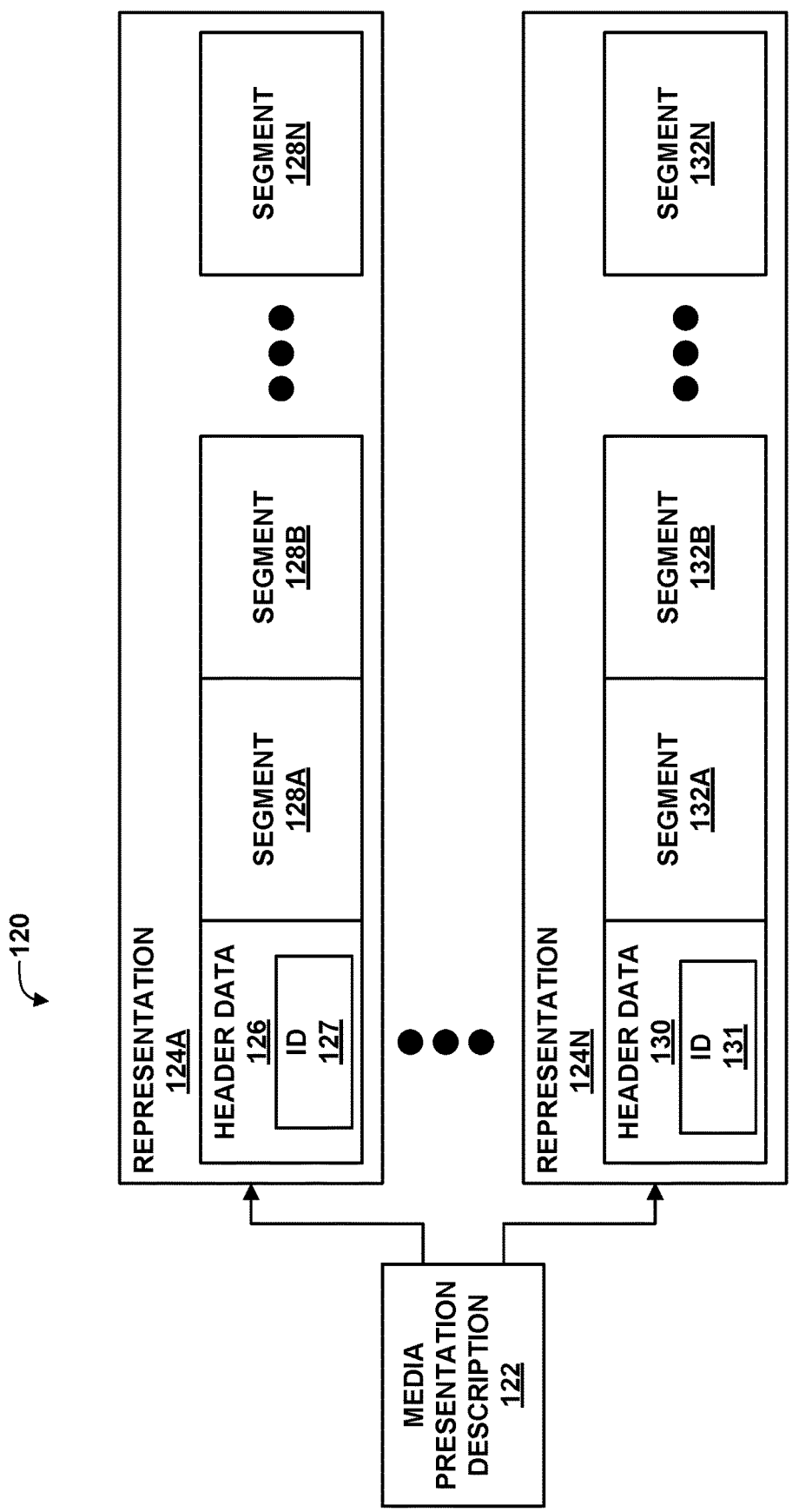
FIG. 2 is a conceptual diagram illustrating elements of example multimedia content.

FIG. 2 is a conceptual diagram illustrating elements of example multimedia content 120. Multimedia content 120 may correspond to multimedia content 64 (FIG. 1), or another multimedia content stored in storage medium 62. In the example of FIG. 2, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-N (segments 132). The letter N is used to designate the last movie fragment in each of representations 124 as a matter of convenience. In some examples, there may be different numbers of movie fragments between representations 124.

Although FIG. 2 describes an example where system 10 (FIG. 1) is configured for DASH, in some examples, system 10 may be configured for other media playback control protocols, for example, but not limited to, real-time streaming protocol (RTSP), real-time transport protocol (RTP), RTP control protocol (RTCP), session description protocol (SDP), another media playback control protocol, or a combination thereof.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally, or alternatively, such characteristics may be fully included within MPD 122.

As shown, header data 126 may include a representation identifier ("ID") 127 that may be used to identify representation 124A. For example, content preparation device 20 may assign representation 124A representation identifier 127. In this example, content preparation device 20 may assign representation 124N representation identifier 131 that is different than representation identifier 127. In some examples, IDs 127, 131 may correspond to uniform resource locator (URL) prefixes. For example, representation 124A may have an identifier value of "1" and be available from "www.example.com," such that ID 127 may have a value of "www.example.com/1." Further, each of segments 128, 132 may include an identifier, such as an enumerated identifier, to complete the URL. For example, a first MP4 segment available from representation "1" at "example.com" may have a URL of "example.com/1/1.mp4." Content preparation device 20 may assign a unique representation identifier to each one of representations 124.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 2. MPD 122 may include characteristics as described by the 3GPP Specification, with the addition of any or all of the signaled information described in this disclosure.

As noted above, each of segments 128, 132 may be associated with a unique uniform resource locator (URL). Thus, each of segments 128, 132 may be independently retrievable using a streaming network protocol, such as DASH, although other streaming network protocols may be used. In this manner, a destination device, such as client device 40, may use an HTTP GET request to retrieve segments 128 or 132. In some examples, client device 40 may use HTTP partial GET requests to retrieve specific byte ranges of segments 128 or 132. For example, client device 40 may use a first HTTP partial GET request to initially retrieve data representative of most-interested regions from one of segments 128, 132, determine the one or more most-interested regions, then use a second HTTP partial GET request to pre-fetch video data for the one or more most-interested regions from one of segments 128, 132, assuming the most-interested regions data is included within segments 128, 132, e.g., in file format information.

In accordance with the techniques of this disclosure, MPD 122 may include most-interested regions data representative the one or more most-interested regions. For example, MPD 122 may include, for each of segments 128, 132, elements or attributes representative of a respective position of a most-interested region relative to a base region and a respective size of the most-interested region relative to a base region.

More specifically, for example, MPD 122 may include, for each of segments 128, 132 (or one or more pictures within segments 128, 132), elements or attributes that include, for each of the one or more most-interested regions, a first syntax element representative of a left horizontal offset of the respective most-interested region relative to the base region, a second syntax element representative of a top vertical offset of the respective most-interested region relative to the base region, a third syntax element representative of a width of the respective most-interested region relative to the base region, and a fourth syntax element representative of a height of the respective most-interested region relative to the base region.

Additionally, or alternatively, rather than directly signaling a position and size of one or more most-interested regions, MPD 122 may include an identifier that indicates the position and size of the one or more most-interested regions. For example, MPD 122 may include one or more representation identifiers representative of one or more representations of the image, each representation of the one or more representations including VCL data for the one or more most-interested regions.

Figure 3:
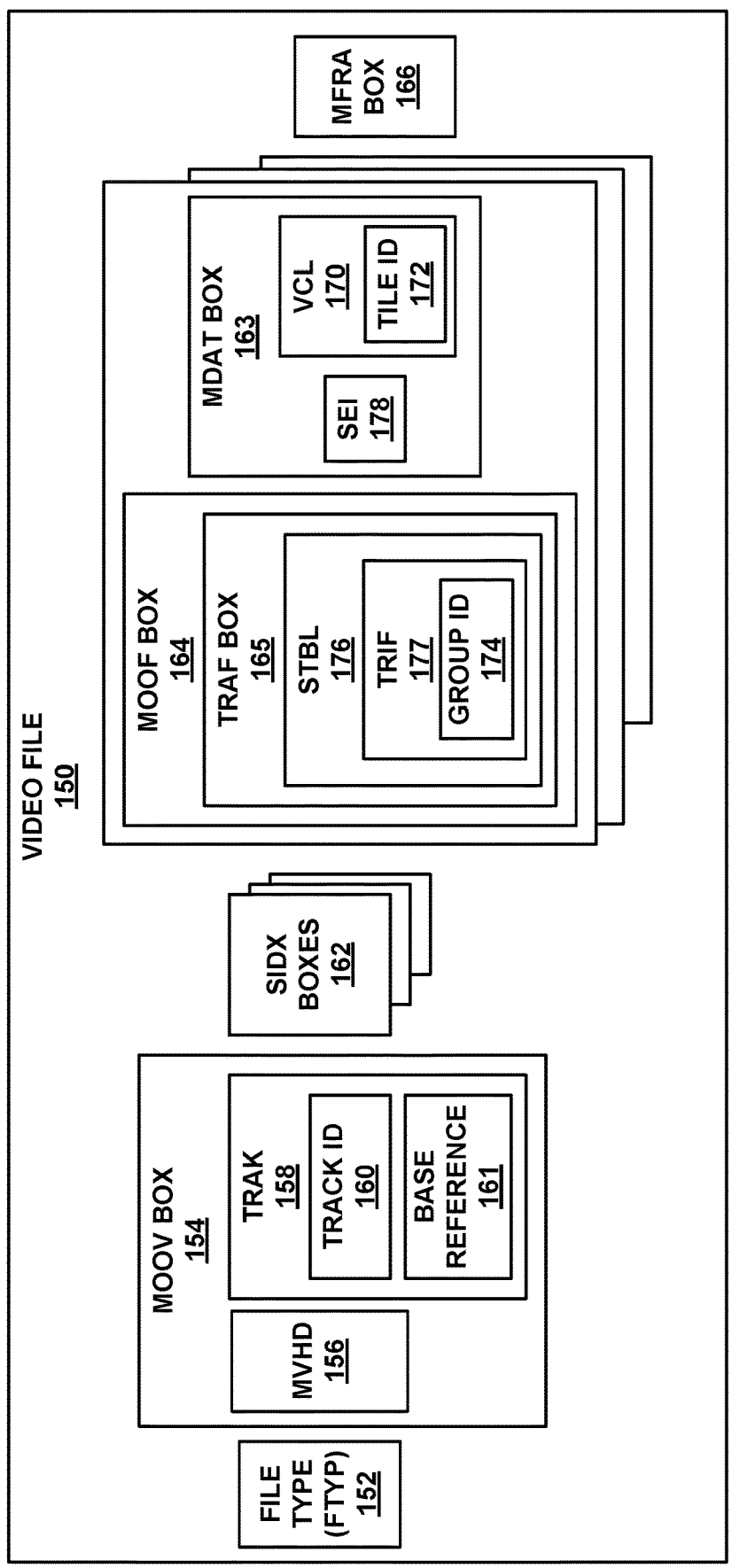
FIG. 3 is a block diagram illustrating elements of an example video file, which may correspond to a representation of FIG. 2.

FIG. 3 is a block diagram illustrating elements of an example video file 150, which may correspond to a segment of a representation, such as one of segments 128, 132 of FIG. 2. Each of segments 128, 132 may include data that conforms substantially to the arrangement of data illustrated in the example of FIG. 3. Video file 150 may be said to encapsulate a segment. As described above, video files in accordance with the ISO base media file format and extensions thereof store data in a series of objects, referred to as "boxes." In the example of FIG. 3, video file 150 includes file type (FTYP) box 152, movie (MOOV) box 154, segment index (SIDX) boxes 162, movie fragment (MOOF) box 164, media data (MDAT) box 163, and movie fragment random access (MFRA) box 166. Although FIG. 3 represents an example of a video file, it should be understood that other media files may include other types of media data (e.g., audio data, timed text data, or the like) that is structured similarly to the data of video file 150, in accordance with the ISO base media file format and its extensions.

FTYP box 152 generally describes a file type for video file 150. File type box 152 may include data that identifies a specification that describes a best use for video file 150. File type box 152 may alternatively be placed before MOOV box 154, MOOF box 164, and/or MFRA box 166.

In some examples, a segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 3, includes movie header (MVHD) box 156 and track (TRAK) box 158. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. As shown, TRAK box 158 may include track identifier (ID) 160. In some examples, TRAK box 158 may include coded video pictures, while in other examples, the coded video pictures of the track may be included in MDAT box 163, which may be referenced by data of TRAK box 158 and/or SIDX boxes 162.

In some examples, TRAK box 158 may include a track base 'TBAS' reference (or simply, base reference) 161. Base reference 161 refers to an HEVC or L-HEVC tile base track that does not include VCL NAL units. It should be understood that base reference 161 may be included within a box of TRAK box 158. For example, base reference 161 may be included in a track reference box ('TREF'), which is directly included in a TRAK box 158.

Video file 150 may include a respective pair of MOOF box 164 and MDAT box 163 for each respective track included in video file 150. As shown, each MOOF box 164, in the example of FIG. 3, includes a track fragment (TRAF) box 165 for each respective track included in video file 150. In general, TRAF box 165 may include non-VCL data and VCL data for a respective track. Further, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track of TRAF box 165. TRAF box 165 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within TRAK box 158 describing the parameter set track.

TRAF box 165, in the example of FIG. 3, includes sample table box (STBL) 176. STBL 176 may include information specifying characteristics of a sample group. For example, as shown, STBL 176 may include tile region group entry (TRIF) 177, which may specify a tile region associated with group identifier 174.

MDAT box 163, in the example of FIG. 3, includes SEI message 178 and VCL NAL unit 170. NAL unit 170 may include one or more coded video pictures. VCL NAL unit 170 may include one or more tiles. In the example of FIG. 3, VCL NAL unit 170 includes tile identifier 172 representative of a tile included in VCL NAL unit 170.

In some examples, VCL NAL unit 170 may include one or more groups of pictures (GOPs), each of which may include a number of coded video pictures, e.g., frames or pictures. In addition, as described above, MDAT box 163 may include sequence data sets in some examples. TRAF box 165 may include a movie fragment header box (MFHD, not shown in FIG. 3). The MFHD box may describe characteristics of a corresponding movie fragment of MDAT box 163, such as a sequence number for the corresponding movie fragment. MDAT box 163 may be included in order of sequence number in video file 150.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include at least one VCL NAL unit 170 which contains the information to construct all the pixels of the access unit and other associated non-VCL NAL units, such as SEI message 178. Accordingly, encapsulation unit 30 may include a sequence data set, which may include SEI message 178, in MDAT box 163. Encapsulation unit 30 may further signal the presence of a sequence data set and/or SEI message 178 as being present in MDAT box 163.

Video file 150 may include data representative of the one or more most-interested regions in accordance with the techniques of this disclosure. More specifically, video file 150 may include the data representative of the one or more most-interested regions in file format header information of video file 150. For example, video file 150 may include file format information that signals the one or more most-interested regions information. In some examples, SEI message 178 and/or MPD 122 of FIG. 2 may include data representative of the one or more most-interested regions.

SEI message 178 can be included as part of H.264/AVC, H.265/HEVC, or other video codec specifications. In the example of FIG. 3, SEI message 178 may include data representative of most-interested regions for a corresponding picture of, e.g., VCL NAL unit 170. In other examples, such most-interested regions data may be included in 1) a file format box or structure for signalling of the information in file format, a DASH MPD attribute or element for signalling of the information in DASH MPD (e.g., MPD 122 of FIG. 2, in another box or structure, or a combination thereof.

MFRA box 166 may describe random access points within movie fragments of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

In accordance with the techniques of this disclosure, a data structure in file format information of video file 150 may include most-interested regions data that represents the one or more most-interested regions. For example, STBL 176 may include most-interested regions data that represents the one or more most-interested regions. In some examples, TRAF box 165 may include most-interested regions data that represents the one or more most-interested regions. In some examples, SIDX boxes 162 may include most-interested regions data that represents the one or more most-interested regions. Additionally, or alternatively, SEI message 178 may include most-interested regions data that represents the one or more most-interested regions.

A data structure in file format information of video file 150 may include an indication, for each most-interested region of the one or more most-interested regions, a plurality of values for a plurality of syntax elements representative of a position of a respective most-interested region and a size of the respective most-interested region. For example, STBL 176 may include most-interested regions data that specifies, for each most-interested region of the one or more most-interested regions, the plurality of values for a plurality of syntax elements representative of a position of a respective most-interested region and a size of the respective most-interested region. In some examples, TRAF box 165 may include most-interested regions data that specifies, for each most-interested region of the one or more most-interested regions, the plurality of values for a plurality of syntax elements representative of a position of a respective most-interested region and a size of the respective most-interested region. In some examples, SIDX boxes 162 may include most-interested regions data that specifies, for each most-interested region of the one or more most-interested regions, the plurality of values for a plurality of syntax elements representative of a position of a respective most-interested region and a size of the respective most-interested region. Additionally, or alternatively, SEI message 178 may include most-interested regions data that specifies, for each most-interested region of the one or more most-interested regions, the plurality of values for a plurality of syntax elements representative of a position of a respective most-interested region and a size of the respective most-interested region.

In some examples, video file 150 may include, for each most-interested region of the one or more most-interested regions, a first syntax element representative of an up offset of the respective most-interested region relative to a full image, a second syntax element representative of a bottom offset of the respective most-interested region relative to the full image, a third syntax element representative of a left offset of the respective most-interested region relative to the full image, and a fourth syntax element representative of a right offset of the respective most-interested region relative to the full image.

In some examples, video file 150 may include, for each most-interested region of the one or more most-interested regions, a first set of two syntax elements representative of a coordinate, in luma samples relative to a full image, of the upper left corner of a rectangle that is the respective most-interested region and a second set of two syntax elements representative of a width and height of the respective most-interested region.

In some examples, video file 150 may include, for each most-interested region of the one or more most-interested regions, a set of two syntax elements representative of a coordinate, in luma samples relative to a full image, of the upper left corner of a rectangle that is the respective most-interested region. In some examples, video file 150 may include, for each most-interested region of the one or more most-interested regions, a flag that indicates whether the respective most-interested region includes a set of two syntax elements representative of a width and height of the respective most-interested region.

In some examples, video file 150 may include, for each most-interested region of the one or more most-interested regions, a set of three syntax elements (e.g., a yaw degree, pitch degree, and radius length) indicating a coordinate, in luma samples relative to a sphere for the image, of the upper left corner of a rectangle that is the respective most-interested region and a set of two syntax elements representative of a width of the pitch and height of the yaw of the respective most-interested region.

A detailed example of a sample group that may be included in TRAF box 165 is as follows.

A new sample group is designed for signaling of the one or more most-interested regions of VR video. The sample grouping type is 'mir'.

The one or more most-interested regions sample group documents the one or more most-interested regions of a VR video represented in file. The one or more most-interested regions may be determined by the intent of the director or producer, or by user statistics by a service or content provider, e.g., through the statistics of which regions have been requested/seen the most by users when the VR video content was provided through a streaming service. A most-interested region in a VR video picture is one of the regions that are statistically most likely rendered to the user at the presentation time of the picture.

NOTE: The information of most-interested regions may be used for data pre-fetching in VR adaptive streaming by edge servers or clients and/or transcoding optimization when a VR video is transcoded, e.g., to a different codec, projection mapping.

In this example, when the SampleToGroupBox with grouping_type equal to 'mir' is included in a Track Fragment Box ('TRAF'), the version of the SampleToGroupBox shall be equal to 2.

In this example, version 2 of the SampleToGroupBox allows the samples documented in SampleToGroupBox to refer to the samples contained in one or more subsequent track fragment. In other words, when the version is 2 for the SampleToGroupBox, it is not an error for the total sample count in this box to be greater than the total number of samples in the current track fragment box, but it is an error for the total sample count in this box to be greater than the total number of samples in all track fragments starting from the current track fragment in the track, and in that case the reader behavior would be undefined.

In this example, the syntax of the sample group entry is as follows:

```
class MostInterestedRegions( ) extends
VisualSampleGroupEntry ('mir') {
    unsigned int(16) entry_count;
    for (i=1; i<=entry_count; i++) {
        unsigned int(16) left_horizontal_offset;
        unsigned int(16) top_vertical_offset;
        unsigned int(16) region_width;
        unsigned int(16) region_height;
    }
}
```

In this example, the semantics for the example syntax discussed above are as follows:

entry_count specifies the number of entries in the sample group entry.

left_horizontal_offset, top_vertical_offset, region_width, and region_height are integer values that indicate the position and size of the most-interested region. left_horizontal_offset and top_vertical_offset indicate the horizontal and vertical coordinates, respectively, in luma samples, of the upper left corner of the most-interested region in the coded pictures to which this sample group entry applies. region_width and region_height indicate the width and height, respectively, in luma samples, of the most-interested region in the coded pictures to which this sample group entry applies.

Alternatively, the semantics of left_horizontal_offset, top_vertical_offset, region_width, and region_height are as follows:

left_horizontal_offset, top_vertical_offset, region_width, and region_height are integer values that indicate the position and size of the most-interested region. left_horizontal offset and top_vertical offset indicate the horizontal and vertical coordinates, respectively, in luma samples, of the upper left corner of the most-interested region in the coded pictures that this sample group entry applies to and that have the highest resolution among all the alternative tracks. region_width and region_height indicate the width and height, respectively, in luma samples, of the most-interested region in the coded pictures that this sample group entry applies to and that have the highest resolution among all the alternative tracks.

A data structure in file format information of video file 150 may include an indication, for each most-interested region of the one or more most-interested regions, a plurality of values for a plurality of syntax elements representative of a position of a respective most-interested region relative to a base region and a size of the respective most-interested region relative to the base region. For example, STBL 176 may include most-interested regions data that specifies, for each most-interested region of the one or more most-interested regions, the plurality of values for a plurality of syntax elements representative of a position of a respective most-interested region relative to the base region and a size of the respective most-interested region relative to the base region. In some examples, TRAF box 165 may include most-interested regions data that specifies, for each most-interested region of the one or more most-interested regions, the plurality of values for a plurality of syntax elements representative of a position of a respective most-interested region relative to the base region and a size of the respective most-interested region relative to the base region. In some examples, SIDX boxes 162 may include most-interested regions data that specifies, for each most-interested region of the one or more most-interested regions, the plurality of values for a plurality of syntax elements representative of a position of a respective most-interested region relative to the base region and a size of the respective most-interested region relative to the base region. Additionally, or alternatively, SEI message 178 may include most-interested regions data that specifies, for each most-interested region of the one or more most-interested regions, the plurality of values for a plurality of syntax elements representative of a position of a respective most-interested region relative to the base region and a size of the respective most-interested region relative to the base region.

More specifically, for example, a data structure in file format information of video file 150 may include, for each most-interested region of the one or more most-interested regions, a first syntax element representative of a left horizontal offset of the respective most-interested region relative to the base region, a second syntax element representative of a top vertical offset of the respective most-interested region relative to the base region, a third syntax element representative of a width of the respective most-interested region relative to the base region, and a fourth syntax element representative of a height of the respective most-interested region relative to the base region. In some examples, video file 150 may include, for each most-interested region of the one or more most-interested regions, a first syntax element representative of an up offset of the respective most-interested region relative to the base region, a second syntax element representative of a bottom offset of the respective most-interested region relative to the base region, a third syntax element representative of a left offset of the respective most-interested region relative to the base region, and a fourth syntax element representative of a right offset of the respective most-interested region relative to the base region.

For example, STBL 176 may include, for each most-interested region of the one or more most-interested regions, a first syntax element representative of a left horizontal offset of the respective most-interested region relative to the base region, a second syntax element representative of a top vertical offset of the respective most-interested region relative to the base region, a third syntax element representative of a width of the respective most-interested region relative to the base region, and a fourth syntax element representative of a height of the respective most-interested region relative to the base region.

In some examples, TRAF box 165 may include, for each most-interested region of the one or more most-interested regions, a first syntax element representative of a left horizontal offset of the respective most-interested region relative to the base region, a second syntax element representative of a top vertical offset of the respective most-interested region relative to the base region, a third syntax element representative of a width of the respective most-interested region relative to the base region, and a fourth syntax element representative of a height of the respective most-interested region relative to the base region.

A detailed example of a sample group that may be included in TRAF box 165 is as follows.

A new sample group is designed for signaling of the one or more most-interested regions of VR video. The sample grouping type is 'mir'.

The one or more most-interested regions sample group documents the one or more most-interested regions of a VR video represented in file. The one or more most-interested regions may be determined by the intent of the director or producer, or by user statistics by a service or content provider, e.g., through the statistics of which regions have been requested/seen the most by users when the VR video content was provided through a streaming service. A most-interested region in a VR video picture is one of the regions that are statistically most likely rendered to the user at the presentation time of the picture.

NOTE: The information of most-interested regions may be used for data pre-fetching in VR adaptive streaming by edge servers or clients and/or transcoding optimization when a VR video is transcoded, e.g., to a different codec, projection mapping.

In this example, when the SampleToGroupBox with grouping_type equal to 'mir' is included in a Track Fragment Box (TRAF'), the version of the SampleToGroupBox shall be equal to 2.

In this example, version 2 of the SampleToGroupBox allows the samples documented in SampleToGroupBox to refer to the samples contained in one or more subsequent track fragment. In other words, when the version is 2 for the SampleToGroupBox, it is not an error for the total sample count in this box to be greater than the total number of samples in the current track fragment box, but it is an error for the total sample count in this box to be greater than the total number of samples in all track fragments starting from the current track fragment in the track, and in that case the reader behavior would be undefined.

In an example, the syntax of the sample group entry is as follows:

```
class MostInterestedRegions( ) extends
VisualSampleGroupEntry ('mir') {
    unsigned int(32) regionbase_track_id;
    unsigned int(16) entry_count;
    for (i=1; i<=entry_count; i++) {
        unsigned int(16) left_horizontal_offset;
        unsigned int(16) top_vertical_offset;
        unsigned int(16) region_width;
        unsigned int(16) region_height;
    }
}
```

And the semantics in this example are as follows:

regionbase_track_id specifies the track for specification of the base region against which the positions and sizes of the one or more most-interested regions are specified. Let the samples that are in the current track and that this sample group entry applies to be the target samples. The samples that are in the track with track_id equal to regionbase_track_id and have the same sample numbers as the target samples as the collocated samples. The base region is the entire region of the pictures that are entirely or partially represented by the coded video data carried in collocated samples.

entry_count specifies the number of entries in the sample group entry.

left_horizontal_offset, top_vertical_offset, region_width, and region_height are integer values that indicate the position and size of the most-interested region. left_horizontal_offset and top_vertical_offset indicate the horizontal and vertical coordinates, respectively, in luma samples, of the upper left corner of the most-interested region in relative to the base region. region_width and region_height indicate the width and height, respectively, in luma samples, of the most-interested region in relative to the base region.

In some examples, SIDX boxes 162 may include, for each most-interested region of the one or more most-interested regions, a first syntax element representative of a left horizontal offset of the respective most-interested region relative to the base region, a second syntax element representative of a top vertical offset of the respective most-interested region relative to the base region, a third syntax element representative of a width of the respective most-interested region relative to the base region, and a fourth syntax element representative of a height of the respective most-interested region relative to the base region.

Additionally, or alternatively, SEI message 178 may include, for each most-interested region of the one or more most-interested regions, a first syntax element representative of a left horizontal offset of the respective most-interested region relative to the base region, a second syntax element representative of a top vertical offset of the respective most-interested region relative to the base region, a third syntax element representative of a width of the respective most-interested region relative to the base region, and a fourth syntax element representative of a height of the respective most-interested region relative to the base region.

A data structure in file format information of video file 150 may include an indication, for each most-interested region of the one or more most-interested regions, one or more tile identifiers representative of one or more tiles of the image. For example, STBL 176 may include most-interested regions data that specifies, for each most-interested region of the one or more most-interested regions, one or more tile identifiers representative of one or more tiles of the image. In some examples, TRAF box 165 may include most-interested regions data that specifies, for each most-interested region of the one or more most-interested regions, one or more tile identifiers representative of one or more tiles of the image. In some examples, SIDX boxes 162 may include most-interested regions data that specifies, for each most-interested region of the one or more most-interested regions, one or more tile identifiers representative of one or more tiles of the image. Additionally, or alternatively, SEI message 178 may include most-interested regions data that specifies, for each most-interested region of the one or more most-interested regions, one or more tile identifiers representative of one or more tiles of the image. In some examples, the one or more tiles of the image specified by the one or more tile identifiers are spatially collocated with the one or more most-interested regions. In this way, the one or more tile identifiers may identify the one or more most-interested regions without directly signaling a position and size for the one or more most-interested regions.

A data structure in file format information of video file 150 may include, for each most-interested region of the one or more most-interested regions, one or more group identifiers representative of one or more regions of the plurality of regions of the image. For example, STBL 176 may include, for each most-interested region of the one or more most-interested regions, one or more group identifiers representative of one or more regions of the plurality of regions of the image. In some examples, TRAF box 165 may include, for each most-interested region of the one or more most-interested regions, one or more group identifiers representative of one or more regions of the plurality of regions of the image. In some examples, SIDX boxes 162 may include, for each most-interested region of the one or more most-interested regions, one or more group identifiers representative of one or more regions of the plurality of regions of the image. Additionally, or alternatively, SEI message 178 may include, for each most-interested region of the one or more most-interested regions, one or more group identifiers representative of one or more regions of the plurality of regions of the image.

A data structure in file format information of video file 150 may include, for each most-interested region of the one or more most-interested regions, one or more track identifiers representative of one or more tracks. For example, STBL 176 may include, for each most-interested region of the one or more most-interested regions, one or more track identifiers representative of one or more tracks. In some examples, TRAF box 165 may include, for each most-interested region of the one or more most-interested regions, one or more track identifiers representative of one or more tracks. In some examples, SIDX boxes 162 may include, for each most-interested region of the one or more most-interested regions, one or more track identifiers representative of one or more tracks. Additionally, or alternatively, SEI message 178 may include, for each most-interested region of the one or more most-interested regions, one or more track identifiers representative of one or more tracks. In some examples, the one or more tracks specified by the one or more track identifiers include VCL data for the one or more most-interested regions. In this way, the one or more track identifiers may identify the one or more most-interested regions without directly signaling a position and size for the one or more most-interested regions.

A data structure in file format information of video file 150 may include a base reference 161 representative of one or more base tile tracks. For example, TRAK box 158 may include one or more base tile track identifiers representative of base tile track that specifies the one or more most-interested regions.

SEI message 178 may include a syntax element indicating one or more syntax elements representative of an image order count. The image order count may indicate that the data representative of the one or more most-interested regions applies to the image.

Figure 4:
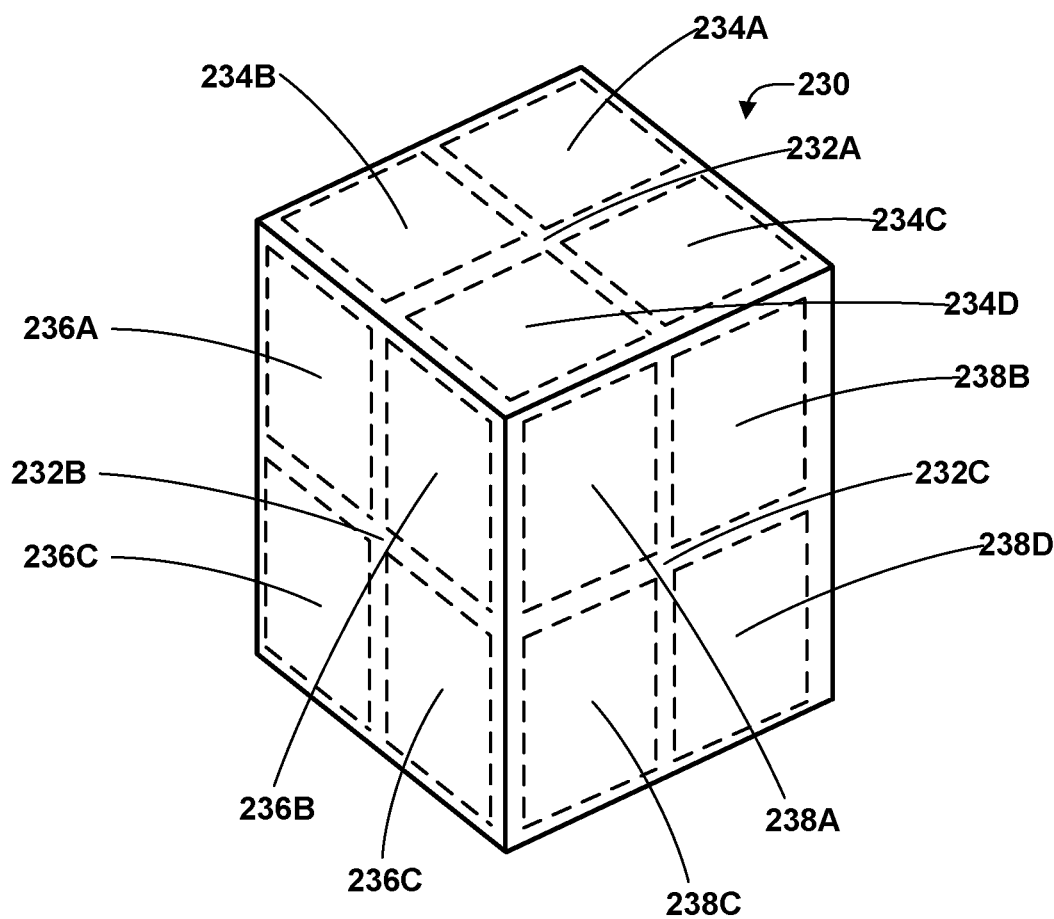
FIG. 4 is a conceptual diagram illustrating an example tile coding in a cuboidal projection.

FIG. 4 is a conceptual diagram illustrating an example tile coding in a cuboidal projection 230. Cuboidal projection 230 includes cube faces 232A, 232B, 232C, as shown, and includes additional cube faces, which are unshown because they are obstructed. In this example, each of the cube faces of cuboidal projection 230 is divided into four tiles: cube face 232A is divided into four tiles 234A-234D, cube face 232B is divided into four tiles 236A-236D, and cube face 232C is divided into four tiles 238A-238D. The other, unshown cube faces would also be divided into four respective tiles, in this example, for a total of 24 small tiles. In general, content preparation device 20 may provide video data for each of the tiles (e.g., tiles 234A-234D, 236A-236D, 238A-238D, and the tiles of the unshown cube faces).

In addition, content preparation device 20 may provide video data for large tiles, which may cover each of the cube faces. For example, content preparation device 20 may provide video data for a tile covering cube face 232A, video data for a tile covering cube face 232B, video data for a tile covering cube face 232C, and video data for tiles covering the unshown cube faces. In some examples, video encoder 28 may encode larger tile sizes only for those viewpoints which are more likely to be viewed. Thus, if it is unlikely that a user would look up or down, video encoder 28 may only code video data for large tiles covering cube faces 232B and 232C, and for opposing cube faces to cube faces 232B and 232C, but not, for example, cube face 232A. Optionally, each of the tiles may have left and right views for stereo video data.

VR is the ability to be virtually present in a non-physical world created by the rendering of natural and/or synthetic images and sound correlated by the movements of the immersed user, allowing the user to interact with that world. With the recent progress made in rendering devices, such as head mounted displays (HMDs), and VR video creation (often also referred to as 360 degree video), a significant quality of experience can be offered. VR applications include gaming, training, education, sports video, online shopping, adult entrainment, and so on.

A typical VR system may include the following components and techniques:

A camera set, which typically consists of multiple individual cameras pointing to different directions and ideally collectively covering all viewpoints around the camera set.

Image stitching, where video pictures taken by the multiple individual cameras are synchronized in the time domain and stitched in the space domain, to be a spherical video, but mapped to a rectangular format, such as equi-rectangular (like a world map) or cube map.

The video in the mapped rectangular format is encoded/compressed using a video codec, e.g., H.265/HEVC or H.264/AVC.

The compressed video bitstream(s) may be stored and/or encapsulated in a media format and transmitted (possibly only the subset covering only the area being seen by a user) through a network to a receiver.

The receiver receives the video bitstream(s) or part thereof, possibly encapsulated in a format, and sends the decoded video signal or part thereof to a rendering device.

The rendering device can be e.g., an HMD, which can track head movement and even eye move moment and rendering the corresponding part of the video such that an immersive experience is delivered to the user.

A feature of VR video compared to normal video is that in VR typically only a subset of the entire video region represented by the video pictures, corresponding to the current FOV, also referred to as viewport, e.g., the area currently being seen by the user, is displayed, while in normal video applications typically the entire video region is displayed. This feature may be utilized to improve the performance of VR video systems, e.g., by using viewport dependent projection mapping or viewport dependent video coding. The performance improvement can be either or both of lower transmission bandwidth and lower decoding complexity compared to conventional VR video systems under the same resolution/quality of the video part presented to the user.

Viewport dependent projection mapping may also be referred to as asymmetric projection mapping. One example is sub-sampled cube-map, for example, cuboidal projection 230. A typical cub-map may include of six equal-sized faces. In one example of a sub-sampled cub-map, one of the faces can be kept unchanged, while the face on the opposite side can be sub-sampled or down-scaled to a smaller size located at the center area of the original face shape, and other faces are geometrically scaled accordingly (still keeping the six faces). The extreme may be to down-scale the face on the opposite side to be a single point, and thus the cube becomes a pyramid. In another example of sub-sampled cub-map, some faces are proportionally down-sized e.g., by a 2×2 ratio (i.e., 2:1 in each direction parallel to an edge of the face).

Such down-sized scaling can also be applied to different regions for other projection mappings such as equi-rectangular. One example is to down-size both the upper and bottom regions (i.e., the poles).

Viewport dependent video coding may also be referred to as viewport based partial video decoding, to enable decoding only partially the entire encoded video region to provide sufficient information for display of the current FOV or viewport.

In one example of viewport dependent video coding, the VR video is coded using motion-constrained sets of tiles such that each potential region covering a FOV or viewport can be independently decoded from other regions. For a particular current FOV or viewport, the coded video data of the minimum set of independently decodable tiles that cover the current FOV or viewport is sent to the client, decoded, and displayed. A shortcoming of this approach is that when the user turns his or her head quickly to a new FOV that is not covered by the sent video data, nothing in the area not covered by the tiles of the video data can be seen before the data covering the new FOV arrives. This can easily happen unless the round trip time of the network is extremely low, e.g., at a magnitude of 10 milliseconds, which is not feasible or at least a big challenge today or in near future.

Another example of viewport dependent video coding was proposed in U.S. patent application Ser. No. 15/195, 439, filed Jun. 28, 2016, the entire content of which is incorporated by reference herein, named independent multi-resolution coding (IMRC), wherein the spherical/panorama video is encoded at multiple different resolutions independent of each other, and each representation is coded using motion-constrained sets of tiles. The receiver chooses to decode different portions of the spherical/panorama video at different resolutions. Typically, the portion of the spherical video that is being currently observed by the user, i.e., the current FOV or the current viewport, is part of the video bitstream coded at the highest resolution. The region surrounding the current FOV is part of the video bitstream coded using a slightly lower resolution, and so on. The portion of the panorama directly behind the observer's head is part of the video bitstream coded at the lowest resolution. It is claimed that, in case of a head movement by the user, the user experience will degrade only by a small amount in most cases, and the quality degradation being most severe only in case of very large sudden head movement, which is rare.

In yet another example of viewport dependent video coding, video bitstreams of multiple-resolutions are scalable-coded using a scalable video codec such as SHVC. In addition, the entire bitstream of the lowest resolution video (or the base layer) is always sent. The lowest resolution video does not need to be coded using tiles or motion-constrained sets of tiles, though it would also work if it is coded using tiles or motion-constrained sets of tiles. For other aspects, the same strategy as described above is applied. This approach allows more efficient coding of the lowest resolution video because coding of tiles or tile motion-constrained sets of tiles reduces coding efficiency, and also more efficient coding of streams of higher resolutions due the use of inter-layer prediction. Furthermore, this approach also allows for more efficient FOV switching, because once FOV switching starts, the server or edge server can immediately stop sending video data that is from the video stream of a higher resolution (than the base layer) and that is not covering any region of the new FOV. If the video data of the lowest resolution covering the current FOV is not sent (i.e., only the video data of the highest resolution covering the current FOV is sent), during FOV switching, the server sometimes would have to continue sending video data that is from the video stream of a highest resolution and that is covering only the old FOV or part thereof, to be prepared such that the user can at least see the lowest-quality video in case he/she turns back to the old FOV or part thereof.

In MPEG contribution m37819, a use case was discussed on signaling and using of information on director's cut, such that the VR playback may display the dynamically changing viewport that a director wants the audience to focus on even when the user is not turning his/her head or change the viewport through other UI. It was mentioned that such viewports may be provided with an omnidirectional video scene by scene.

Rather than necessarily relying only on a user's field of view to select a quality to request tiles (e.g., tiles 234A-234D, 236A-236D, 238A-238D and the tiles of the unshown cube faces), one or more techniques described herein permit client device 40 and/or server device 60 to video data for one or more tiles that include one or more most-interested regions. For example, client device 40 may request tiles 234A-234D before receiving a video file that includes video data for 234A-234D when data representative of the one or more most-interested regions indicates that tiles 234A-234D include the one or more most-interested regions. In an example where the FOV includes regions of the image that are not included in the one or more most-interested regions, upon receiving the FOV of the user, client device 40 may request further tiles (e.g., 236A-236D, 238A-238D) to satisfy a user's FOV. In this manner, the one or more most-interested regions may be requested (e.g., prior to receiving a video file that includes video data for the image) to permit video data for the one or more most-interested regions to be pre-fetched, thereby improving a playback of a video, such as, a virtual reality video.

Figure 5:
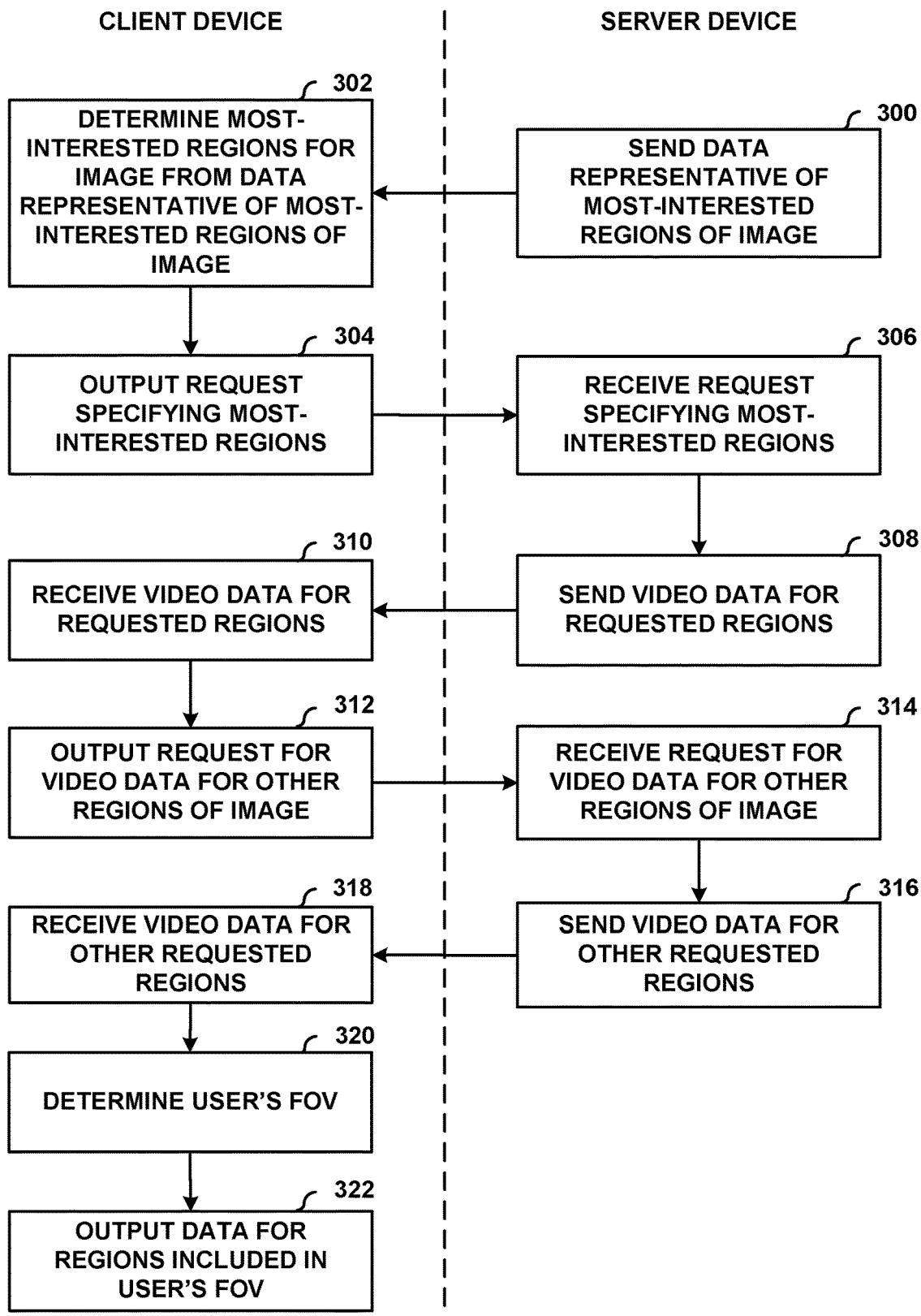
FIG. 5 is a flowchart illustrating an example approach for determining information for video data in accordance with one or more techniques described in this disclosure.

FIG. 5 is a flowchart illustrating an example approach for determining information for video data in accordance with one or more techniques described in this disclosure. The methods of FIG. 5 are described with respect to client device 40 and server device 60 of FIG. 1. However, it should be understood that other devices may be configured to perform these techniques.

Initially, although not shown in FIG. 5, client device 40 may request most-interested regions data for an image. For example, client device 40 may request a media presentation description (MPD), an SEI message, or any of the other types of data discussed above corresponding to the image. In response to this request, server device 60 may send data representative of the one or more most-interested regions of an image (300). The data representative of the one or more most-interested regions may be included in a bitstream including the video data. For example, server device 60 may send an SEI message (e.g., SEI message 178 of FIG. 3) including most-interested regions data representing the one or more most-interested regions when the most-interested regions are static. In some examples, server device 60 sends file format header information (e.g., STBL 176 of FIG. 3, TRAK box 158 of FIG. 3, SIDX boxes 162 of FIG. 3, etc.) including most-interested regions data representing the one or more most-interested regions. In some examples, server device 60 sends a MPD (e.g., MPD 122 of FIG. 2) including most-interested regions data representing the one or more most-interested regions.

Client device 40 may determine the one or more most-interested regions of the image from the data representative of the one or more most-interested regions (302). For example, client device 40 may determine, for each one of the one or more most-interested regions, values for syntax elements representative of a position of the respective most-interested region and a size of the respective most-interested region using the data representative of the one or more most-interested regions. In some examples, client device 40 may determine, for each one of the one or more most-interested regions, an identifier (e.g., tile identifier 172 of FIG. 3, group identifier 174 of FIG. 3, track identifier 160 of FIG. 3, etc.) that is indicative of the one or more most-interested regions.

Client device 40 may output a request for video data for the one or more most-interested regions (304). For example, client device 40 may generate a request for video data that specifies the one or more most-interested regions using the data representative of the one or more most-interested regions and output the request. In this example, client device 40 may be an entity that contains a video decoder. In other examples, however, the device that generates the request for video data that specifies the one or more most-interested regions and outputs the request may be a network element such as a content delivery network (CDN) node. Server device 60 may receive the request for video data for the one or more most-interested regions (306) and may send video data for one or more requested regions (308). Client device 40 may receive the video data for the one or more requested regions (310).

Client device 40 may output a request for video data for one or more other regions of the image (312). For example, client device 40 may request for video data for images 234C-D of FIG. 4 when the one or more most-interested regions include images 238A-D of FIG. 4 and when the user's FOV of the user includes images 238A-D and 234C-D of FIG. 4.

Server device 60 may receive the request for video data for one or more other regions of the image (314) and may send the video data for video data for the one or more other requested regions (316). Client device 40 may receive the video data for the one or more other requested regions (318). Client device 40 may determine a user's FOV (320) and output data for regions included in the user's FOV (322). For example, client device 40 may determine that the FOV of the user includes images 238A-D and 234C-D of FIG. 4 and output images 238A-D and 234C-D of FIG. 4 for display using the high and low-quality video data.

In this manner, the method of FIG. 5 represents an example of a method including determining, by a processor of a device, the processor implemented in circuitry, one or more most-interested regions of a plurality of regions of an image of video data from data representative of the one or more most-interested regions; generating, by the processor, a request specifying the one or more most-interested regions using the data representative of the one or more most-interested regions; and outputting, by the processor, the request to a server device.

Likewise, the method of FIG. 5 also represents an example of a method including determining, by a processor of a source device, the processor implemented in circuitry, one or more most-interested regions of a plurality of regions of an image of video data, the one or more most-interested regions comprising one or more regions that are most likely to be retrieved by a client device; outputting, by the processor, data representative of the one or more most-interested regions, wherein the data representative of the one or more most-interested regions is included in a bitstream including the video data.

Figure 6:
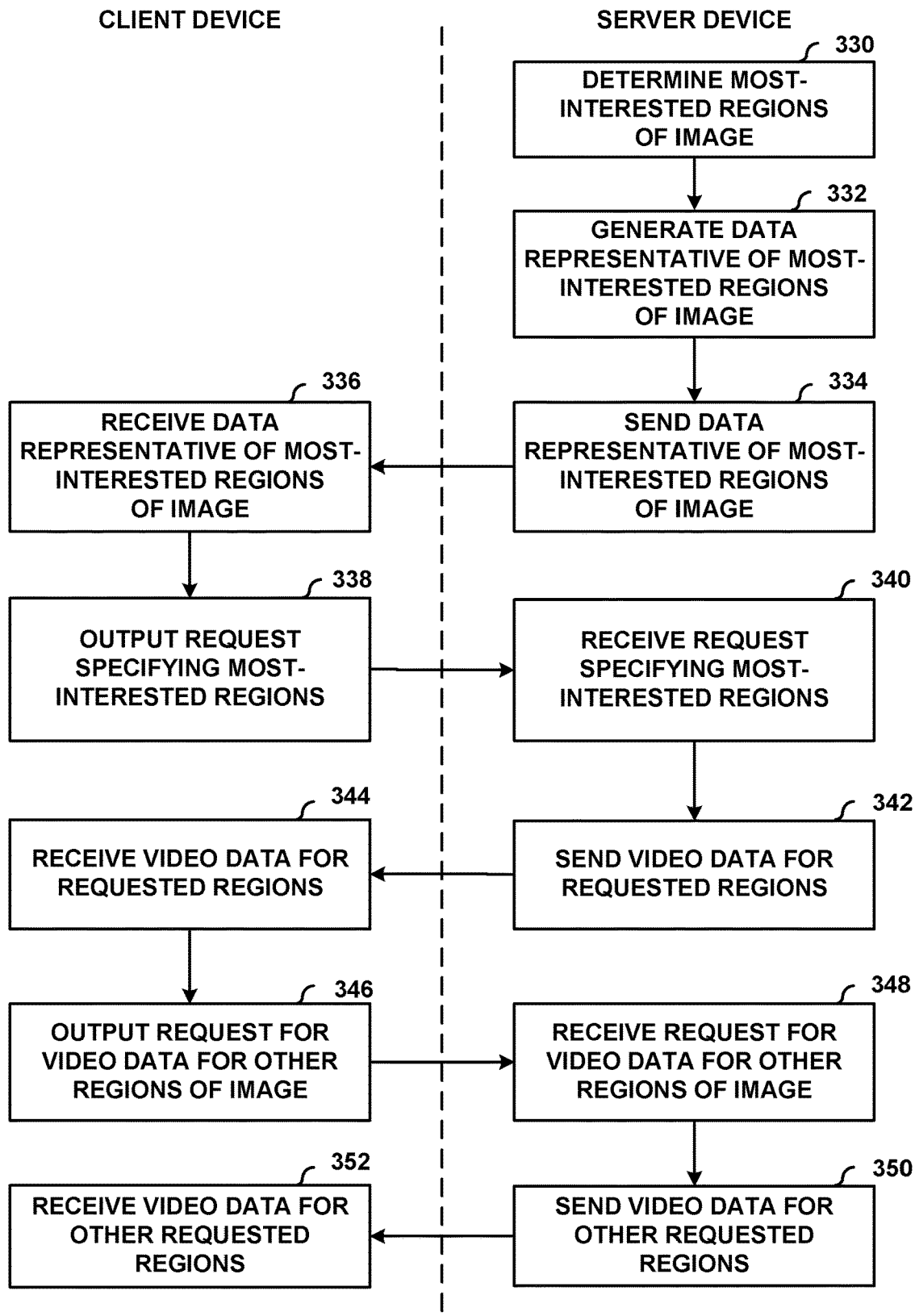
FIG. 6 is a flowchart illustrating an example approach for signaling information for video data in accordance with one or more techniques described in this disclosure.

FIG. 6 is a flowchart illustrating an example approach for signaling information for video data in accordance with one or more techniques described in this disclosure. The methods of FIG. 6 are described with respect to client device 40 and server device 60 of FIG. 1. However, it should be understood that other devices may be configured to perform these techniques.

Initially, although not shown in FIG. 6, client device 40 may request most-interested regions data for an image. For example, client device 40 may request a media presentation description (MPD), an SEI message, or any of the other types of data discussed above corresponding to the image. In response to this request, server device 60 may determine one or more most-interested regions of an image (330). For example, server device 60 may receive an indication of a selection by a director or producer of the one or more most-interested regions or server device 60 (or another device) may derive the one or more most-interested regions from user statistics. In any case, server device 60 may generate data representative of the one or more most-interested regions (332). The data representative of the one or more most-interested regions may be included in a bitstream including the video data. For example, server device 60 generates an SEI message (e.g., SEI message 178 of FIG. 3) including most-interested regions data representing the one or more most-interested regions. In some examples, server device 60 generates file format header information (e.g., STBL 176 of FIG. 3, TRAK box 158 of FIG. 3, SIDX boxes 162 of FIG. 3, etc.) including most-interested regions data representing the one or more most-interested regions. In some examples, server device 60 generates a MPD (e.g., MPD 122 of FIG. 2) including most-interested regions data representing the one or more most-interested regions. In any case, server device 60 may send the data representative of the one or more most-interested regions (334) and client device 40 may receive the data representative of the one or more most-interested regions (336).

In response to receiving the data representative of the one or more most-interested regions, client device 40 may output a request for video data for the one or more most-interested regions of the image (338). For example, client device 40 may output a request specifying the one or more most-interested regions. In some examples, however, the device that outputs the request specifying the one or more most-interested regions may be a network element such as a content delivery network (CDN) node. Server device 60 may receive the request for video data for the one or more most-interested regions of the image (340) and send video data for one or more requested regions (342). Client device 40 may receive the video data for the one or more requested regions (344).

Client device 40 may output a request for video data for one or more other regions of the image (346). Server device 60 may receive the request or video data for one or more other regions of the image (348). In response to receiving the request for video data for one or more other regions of the image, server device 60 may send video data for one or more other requested regions (350). Client device 40 may receive the video data for the one or more other requested regions (352). Although not shown in the example of FIG. 6, client device 40 may then proceed to present at least part of the received video data to a user, e.g., as discussed above with respect to FIG. 5, e.g., based on a field of view of the user.

In this manner, the method of FIG. 6 represents an example of a method including determining, by a processor of a device, the processor implemented in circuitry, one or more most-interested regions of a plurality of regions of an image of video data from data representative of the one or more most-interested regions; generating, by the processor, a request specifying the one or more most-interested regions using the data representative of the one or more most-interested regions; and outputting, by the processor, the request to a server device.

Likewise, the method of FIG. 6 also represents an example of a method including determining, by a processor of a source device, the processor implemented in circuitry, one or more most-interested regions of a plurality of regions of an image of video data, the one or more most-interested regions comprising one or more regions that are most likely to be retrieved by a client device; generating, by the processor, data representative of the one or more most-interested regions, wherein the data representative of the one or more most-interested regions is included in a bitstream including the video data; and outputting, by the processor, after outputting the data representative of the one or more most interested regions, the video data.

Figure 7:
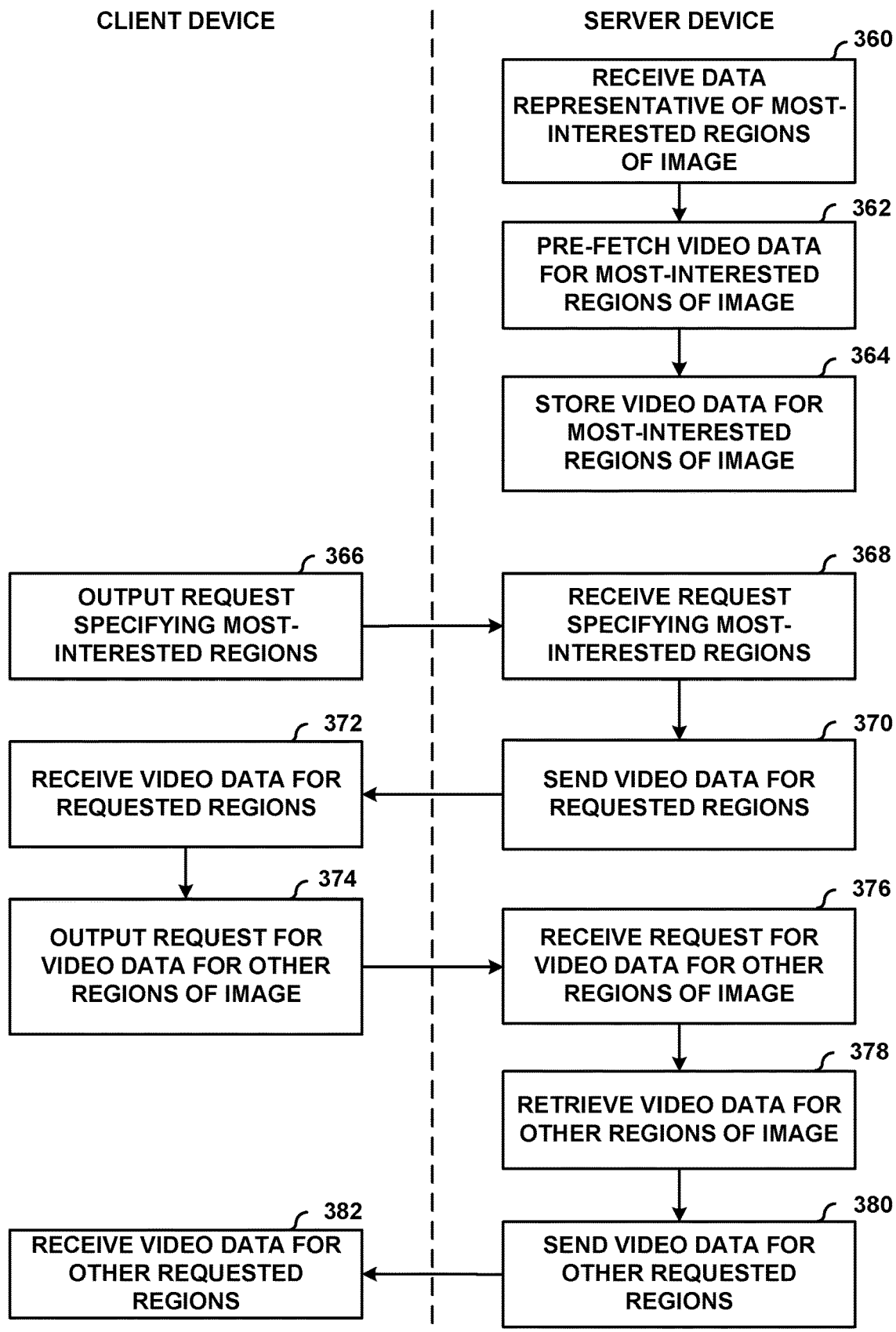
FIG. 7 is a flowchart illustrating an example approach for pre-fetching video data in accordance with one or more techniques described in this disclosure.

FIG. 7 is a flowchart illustrating an example approach for pre-fetching video data in accordance with one or more techniques described in this disclosure. The methods of FIG. 7 are described with respect to client device 40 and server device 60 of FIG. 1. However, it should be understood that other devices may be configured to perform these techniques. In the example of FIG. 7, server device 60 may be configured as a CDN server that initially retrieves data from an origin server, and temporarily stores the data. It should be understood that the example of FIG. 7 demonstrates that either or both of client device 40 and server device 60 may use the data representative of the one or more most-interested regions.

Initially, although not shown in FIG. 7, client device 40 may request data representative of the one or more most-interested regions of an image. For example, client device 40 may request a media presentation description (MPD), an SEI message, or any of the other types of data discussed above corresponding to the image. In response to this request, server device 60 may send (or forward) a request for the data representative of the one or more most-interested regions to an upstream device, such as an origin device and receive data representative of the one or more most-interested regions of an image (360). For example, server device 60 may receive data representative of the one or more most-interested regions of an image from an upstream server (e.g., an edge server), content preparation device 20, or another device.

The data representative of the one or more most-interested regions may be included in a bitstream including the video data. For example, server device 60 receives an SEI message including most-interested regions data representing the one or more most-interested regions. In some examples, server device 60 receives file format header information (e.g., STBL 176 of FIG. 3, TRAK box 158 of FIG. 3, SIDX boxes 162 of FIG. 3, etc.) including most-interested regions data representing the one or more most-interested regions. In any case, server device 60 may pre-fetch video data for the one or more interested regions (362).

Upon pre-fetching video data for the one or more interested regions, server device 60 may store the pre-fetched video data for the one or more most-interested regions (364). In an example where server device 60 is an edge server configured to store (e.g., cache) video data, server device 60 may store the video data for the one or more most-interested regions. In some examples, server device 60 may determine a duration of storage for the video data for the one or more most-interested regions based on the data representative of the one or more most-interested regions of an image. For instance, server device 60 may rank the video data for the one or more most-interested regions higher when server device 60 determines that the video data for the one or more most-interested regions, such that the video data for the one or more most-interested regions is kept for long-term storage while other video data (e.g., for other regions), which was retrieved at a similar time as the video data for the one or more most-interested regions, is removed.

Although not shown in FIG. 7, server device 60 may send data representative of the one or more most-interested regions of the image to client device 40. For example, server device 60 may send a media presentation description (MPD), an SEI message, or any of the other types of data discussed above corresponding to the image.

In response to receiving the data representative of the one or more most-interested regions of the image to client device 40, client device 40 may output a request for video data for the one or more most-interested regions of the image (366). In this example, client device 40 may be an entity that contains a video decoder. In other examples, however, the device that outputs the request for video data for the one or more most-interested regions of the image may be a network element such as a content delivery network (CDN) node. Server device 60 may receive the request for video data for the one or more most-interested regions of the image (368) and may send video data for one or more requested regions (370). Client device 40 may receive the video data for the one or more requested regions (372).

Client device 40 may output a request for video data for one or more other regions of the image (374). Server device 60 may receive the request for video data for the one or more other regions of the image (376). In response to receiving the request for video data for the one or more other regions of the image, server device 60 may retrieve video data for one or more other regions of the image (378). For example, server device 60 may send (or forward) a request for the video data to an upstream device, such as an origin device. In instances where an intermediate network device already has the requested video data cached, the intermediate network device may respond to the request using cached video data. In some instances, the origin server may respond to the request by sending the requested video data.

Upon retrieving the video data for the one or more other regions of the image, server device 60 may send video data for the one or more other requested regions (380). Client device 40 may receive the video data for the one or more other requested regions (382). Although not shown in the example of FIG. 7, client device 40 may then proceed to present at least part of the received video data to a user, e.g., as discussed above with respect to FIG. 5, e.g., based on a field of view of the user.

In this manner, the method of FIG. 7 represents an example of a method including determining, by a processor of a device, the processor implemented in circuitry, one or more most-interested regions of a plurality of regions of an image of video data from data representative of the one or more most-interested regions; generating, by the processor, a request specifying the one or more most-interested regions using the data representative of the one or more most-interested regions; and outputting, by the processor, the request to a server device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of determining information for video, the method comprising:
   determining, by a processor of a client device, the processor implemented in circuitry, one or more most-interested regions of a plurality of regions of an image of video data from data representative of the one or more most-interested regions;
   generating, by the processor, a request specifying the one or more most-interested regions using the data representative of the one or more most-interested regions;
   outputting, by the processor, the request specifying the one or more most-interested regions to a server device;
   receiving, by the processor from the server device, video data for the one or more most-interested regions;
   outputting, by the processor after outputting the request specifying the one or more most-interested regions, a request specifying one or more other regions of the image to the server device; and
   receiving, by the processor from the server device, video data for the one or more other regions.

2. The method of claim 1, further comprising:
   generating, by the processor, the request specifying the one or more other regions of the image using a user's field of view (FOV).

3. The method of claim 1, wherein determining the one or more most-interested regions comprises extracting most-interested regions data from a supplemental enhancement information (SEI) message, wherein the most-interested regions data represents the one or more most-interested regions.

4. The method of claim 1, wherein determining the one or more most-interested regions comprises extracting most-interested regions data from a sample group box included in file format header information, wherein the most-interested regions data represents the one or more most-interested regions.

5. The method of claim 1, wherein determining the one or more most-interested regions comprises extracting most-interested regions data from a sample table box or a track fragment included in file format header information, wherein the most-interested regions data represents the one or more most-interested regions.

6. The method of claim 1, wherein determining the one or more most-interested regions comprises extracting most-interested regions data from a segment index box included in file format header information, wherein the most-interested regions data represents the one or more most-interested regions.

7. The method of claim 1, wherein determining the one or more most-interested regions comprises extracting most-interested regions data from a dynamic adaptive streaming over HTTP (DASH) media presentation description (MPD), wherein the most-interested regions data represents the one or more most-interested regions.

8. The method of claim 1, wherein determining the one or more most-interested regions comprises determining, for each most-interested region of the one or more most-interested regions, a plurality of values for a plurality of syntax elements representative of a position of a respective most-interested region relative to a base region and a size of the respective most-interested region relative to the base region.

9. The method of claim 7, wherein determining the plurality of values for the plurality of syntax elements comprises, for each most-interested region of the one or more most-interested regions:
   extracting a value for a first syntax element representative of a left horizontal offset of the respective most-interested region relative to the base region;
   extracting a value for a second syntax element representative of a top vertical offset of the respective most-interested region relative to the base region;
   extracting a value for a third syntax element representative of a width of the respective most-interested region relative to the base region; and
   extracting a value for a fourth syntax element representative of a height of the respective most-interested region relative to the base region.

10. The method of claim 1, wherein determining the one or more most-interested regions comprises extracting one or more tile identifiers representative of one or more tiles of the image, wherein the one or more tiles are spatially collocated with the one or more most-interested regions.

11. The method of claim 1, wherein determining the one or more most-interested regions comprises extracting one or more group identifiers representative of one or more regions of the plurality of regions of the image.

12. The method of claim 1, wherein determining the one or more most-interested regions comprises extracting one or more track identifiers representative of one or more tracks, each track of the one or more tracks including video coding layer (VCL) data for the one or more most-interested regions.

13. The method of claim 1, wherein determining the one or more most-interested regions comprises extracting one or more representation identifiers representative of one or more representations of the image, each representation of the one or more representations including video coding layer (VCL) data for the one or more most-interested regions.

14. The method of claim 1, wherein determining the one or more most-interested regions comprises:
   extracting one or more base tile track identifiers representative of one or more base tile tracks; and
   extracting most-interested regions data from the one or more base tile tracks using the one or more base tile track identifiers.

15. The method of claim 1, wherein determining the one or more most-interested regions comprises determining one or more syntax elements representative of an image order count, the image order count indicating that the data representative of the one or more most-interested regions applies to the image.

16. A device for determining information for video data, the device comprising one or more processors implemented in circuitry that are configured to:
   determine one or more most-interested regions of a plurality of regions of an image of video data from data representative of the one or more most-interested regions;
   generate a request specifying the one or more most-interested regions using the data representative of the one or more most-interested regions;
   output the request specifying the one or more most-interested regions to a server device;
   receive, from the server device, video data for the one or more most-interested regions;
   output, after outputting the request specifying the one or more most-interested regions, a request specifying one or more other regions of the image to the server device; and
   receive, from the server device, video data for the one or more other regions.

17. The device of claim 16, wherein, to determine the one or more most-interested regions, the one or more processors are further configured to extract most-interested regions data from a supplemental enhancement information (SEI) message, wherein the most-interested regions data represents the one or more most-interested regions.

18. The device of claim 16, wherein, to determine the one or more most-interested regions, the one or more processors are further configured to extract most-interested regions data from a sample group box, a sample table box, a track fragment, or a segment index box included in file format header information, wherein the most-interested regions data represents the one or more most-interested regions.

19. The device of claim 16, wherein, to determine the one or more most-interested regions, the one or more processors are further configured to extract most-interested regions data from a dynamic adaptive streaming over HTTP (DASH) media presentation description (MPD), wherein the most-interested regions data represents the one or more most-interested regions.

20. The device of claim 16, wherein, to determine the one or more most-interested regions, the one or more processors are further configured to determine, for each most-interested region of the one or more most-interested regions, a plurality of values for a plurality of syntax elements representative of a position of a respective most-interested region relative to a base region and a size of the respective most-interested region relative to the base region.

21. The device of claim 20, wherein, to determine the plurality of values for the plurality of syntax elements, the one or more processors are further configured to, for each most-interested region of the one or more most-interested regions:
   extract a value for a first syntax element representative of a left horizontal offset of the respective most-interested region relative to the base region;
   extract a value for a second syntax element representative of a top vertical offset of the respective most-interested region relative to the base region;
   extract a value for a third syntax element representative of a width of the respective most-interested region relative to the base region; and
   extract a value for a fourth syntax element representative of a height of the respective most-interested region relative to the base region.

22. The device of claim 16, wherein, to determine the one or more most-interested regions, the one or more processors are further configured to extract one or more tile identifiers representative of one or more tiles of the image, wherein the one or more tiles are spatially collocated with the one or more most-interested regions.

23. The device of claim 16, wherein, to determine the one or more most-interested regions, the one or more processors are further configured to extract one or more group identifiers representative of one or more regions of the plurality of regions of the image.

24. The device of claim 16, wherein, to determine the one or more most-interested regions, the one or more processors are further configured to extract one or more track identifiers representative of one or more tracks, each track of the one or more tracks including video coding layer (VCL) data for the one or more most-interested regions.

25. The device of claim 16, wherein, to determine the one or more most-interested regions, the one or more processors are further configured to extract one or more representation identifiers representative of one or more representations of the image, each representation of the one or more representations including video coding layer (VCL) data for the one or more most-interested regions.

26. The device of claim 16, wherein, to determine the one or more most-interested regions, the one or more processors are further configured to:
   extract one or more base tile track identifiers representative of one or more base tile tracks; and
   extract most-interested regions data from the one or more base tile tracks using the one or more base tile track identifiers.

27. The device of claim 16, wherein, to determine the one or more most-interested regions, the one or more processors are further configured to determine one or more syntax elements representative of an image order count, the image order count indicating that the data representative of the one or more most-interested regions applies to the image.

28. A device for determining information for video data, the device comprising:
   means for determining one or more most-interested regions of a plurality of regions of an image of video data from data representative of the one or more most-interested regions;
   means generating a request specifying the one or more most-interested regions using the data representative of the one or more most-interested regions;
   means for outputting the request specifying the one or more most-interested regions to a server device;

means for receiving, from the server device, video data for the one or more most-interested regions;
means for outputting, after outputting the request specifying the one or more most-interested regions, a request specifying one or more other regions of the image to the server device; and
means for receiving, from the server device, video data for the one or more other regions.

29. A non-transitory computer-readable storage medium having stored thereon instructions that, when executed, cause a processor to:
determine one or more most-interested regions of a plurality of regions of an image of video data from data representative of the one or more most-interested regions;
generate a request specifying the one or more most-interested regions using the data representative of the one or more most-interested regions;
output the request specifying the one or more most-interested regions to a server device;
receive, from the server device, video data for the one or more most-interested regions;
output, after outputting the request specifying the one or more most-interested regions, a request specifying one or more other regions of the image to the server device; and
receive, from the server device, video data for the one or more other regions.

30. A method of signaling information for video data, the method comprising:
determining, by a processor of a source device, the processor implemented in circuitry, one or more most-interested regions of a plurality of regions of an image of video data, the one or more most-interested regions comprising one or more regions that are most likely to be retrieved by a client device;
outputting, by the processor to the client device, data representative of the one or more most-interested regions, wherein the data representative of the one or more most-interested regions is included in a bitstream including the video data;
receiving, by the processor from the client device, a request for video data for the one or more most-interested regions;
outputting, by the processor to the client device, after outputting the data representative of the one or more most interested regions, the video data for the one or more most-interested regions;
receiving, by the processor from the client device, a request for video data for one or more other regions of the image; and
outputting, by the processor to the client device, after outputting the video data for the one or more most-interested regions, the video data for the one or more other regions of the image.

31. The method of claim 30, wherein outputting the data representative of the one or more most-interested regions comprises generating a supplemental enhancement information (SEI) message that includes most-interested regions data, wherein the most-interested regions data represents the one or more most-interested regions.

32. The method of claim 30, wherein outputting the data representative of the one or more most-interested regions comprises generating, in file format header information, a sample group box, a sample table box, a track fragment, or a segment index box that includes most-interested regions data, wherein the most-interested regions data represents the one or more most-interested regions.

33. The method of claim 30, wherein outputting the data representative of the one or more most-interested regions comprises generating a dynamic adaptive streaming over HTTP (DASH) media presentation description (MPD) that includes most-interested regions data, wherein the most-interested regions data represents the one or more most-interested regions.

34. The method of claim 30, wherein outputting the data representative of the one or more most-interested regions generating, for each most-interested region of the one or more most-interested regions, a plurality of values for a plurality of syntax elements representative of a position of a respective most-interested region relative to a base region and a size of the respective most-interested region relative to the base region.

35. The method of claim 34, wherein outputting the plurality of values for the plurality of syntax elements comprises, for each most-interested region of the one or more most-interested regions:
generating a value for a first syntax element representative of a left horizontal offset of the respective most-interested region relative to the base region;
generating a value for a second syntax element representative of a top vertical offset of the respective most-interested region relative to the base region;
generating a value for a third syntax element representative of a width of the respective most-interested region relative to the base region; and
generating a value for a fourth syntax element representative of a height of the respective most-interested region relative to the base region.

36. The method of claim 30, wherein outputting the data representative of the one or more most-interested regions comprises generating one or more tile identifiers representative of one or more tiles of the image, wherein the one or more tiles are spatially collocated with the one or more most-interested regions.

37. The method of claim 30, wherein outputting the data representative of the one or more most-interested regions comprises generating one or more group identifiers representative of one or more regions of the plurality of regions of the image.

38. The method of claim 30, wherein outputting the data representative of the one or more most-interested regions comprises generating one or more track identifiers representative of one or more tracks, each track of the one or more tracks including video coding layer (VCL) data for the one or more most-interested regions.

39. The method of claim 30, wherein outputting the data representative of the one or more most-interested regions comprises generating one or more representation identifiers representative of one or more representations of the image, each representation of the one or more representations including video coding layer (VCL) data for the one or more most-interested regions.

40. The method of claim 30, wherein outputting the data representative of the one or more most-interested regions comprises:
generating most-interested regions data at one or more base tile tracks; and
generating, at the data representative of the one or more most-interested regions, one or more base tile track identifiers representative of the one or more base tile tracks.

41. The method of claim 30, wherein outputting the data representative of the one or more most-interested regions comprises generating one or more syntax elements representative of an image order count, the image order count indicating that the data representative of the one or more most-interested regions applies to the image.

42. The method of claim 30, wherein determining the one or more most-interested regions comprises determining the one or more most-interested regions using one or more of an intent of a director or user statistics.

43. A device for signaling information for video data, the device comprising one or more processors implemented in circuitry that are configured to:
 determine one or more most-interested regions of a plurality of regions of an image of video data, the one or more most-interested regions comprising one or more regions that are most likely to be retrieved by a client device;
 output, to the client device, data representative of the one or more most-interested regions, wherein the data representative of the one or more most-interested regions is included in a bitstream including the video data;
 receive, from the client device, a request for video data for the one or more most-interested regions;
 output, to the client device, after outputting the data representative of the one or more most interested regions, the video data for the one or more most-interested regions;
 receive, from the client device, a request for video data for one or more other regions of the image; and
 output, to the client device, after outputting the video data for the one or more most-interested regions, the video data for the one or more other regions of the image.

44. The device of claim 43, wherein, to output the data representative of the one or more most-interested regions, the one or more processors are further configured to generate a supplemental enhancement information (SEI) message that includes most-interested regions data, wherein the most-interested regions data represents the one or more most-interested regions.

45. The device of claim 43, wherein, to output the data representative of the one or more most-interested regions, the one or more processors are further configured to generate, in file format header information, a sample group box, a sample table box, a track fragment, or a segment index box that includes most-interested regions data, wherein the most-interested regions data represents the one or more most-interested regions.

46. The device of claim 43, wherein, to output the data representative of the one or more most-interested regions, the one or more processors are further configured to generate a dynamic adaptive streaming over HTTP (DASH) media presentation description (MPD) that includes most-interested regions data, wherein the most-interested regions data represents the one or more most-interested regions.

47. The device of claim 43, wherein, to output the data representative of the one or more most-interested regions, the one or more processors are further configured to generate, for each most-interested region of the one or more most-interested regions, a plurality of values for a plurality of syntax elements representative of a position of a respective most-interested region relative to a base region and a size of the respective most-interested region relative to the base region.

48. The device of claim 47, wherein, to output the plurality of values for the plurality of syntax elements, the one or more processors are further configured to:
 generate a value for a first syntax element representative of a left horizontal offset of the respective most-interested region relative to the base region;
 generate a value for a second syntax element representative of a top vertical offset of the respective most-interested region relative to the base region;
 generate a value for a third syntax element representative of a width of the respective most-interested region relative to the base region; and
 generate a value for a fourth syntax element representative of a height of the respective most-interested region relative to the base region.

49. The device of claim 43, wherein, to output the data representative of the one or more most-interested regions, the one or more processors are further configured to generate one or more tile identifiers representative of one or more tiles of the image, wherein the one or more tiles are spatially collocated with the one or more most-interested regions.

50. The device of claim 43, wherein, to output the data representative of the one or more most-interested regions, the one or more processors are further configured to generate one or more group identifiers representative of one or more regions of the plurality of regions of the image.

51. The device of claim 43, wherein, to output the data representative of the one or more most-interested regions, the one or more processors are further configured to generate one or more track identifiers representative of one or more tracks, each track of the one or more tracks including video coding layer (VCL) data for the one or more most-interested regions.

52. The device of claim 43, wherein, to output the data representative of the one or more most-interested regions, the one or more processors are further configured to generate one or more representation identifiers representative of one or more representations of the image, each representation of the one or more representations including video coding layer (VCL) data for the one or more most-interested regions.

53. The device of claim 43, wherein, to output the data representative of the one or more most-interested regions, the one or more processors are further configured to:
 generate most-interested regions data at one or more base tile tracks; and
 generate, at the data representative of the one or more most-interested regions, one or more base tile track identifiers representative of the one or more base tile tracks.

54. The device of claim 43, wherein, to output the data representative of the one or more most-interested regions, the one or more processors are further configured to generate one or more syntax elements representative of an image order count, the image order count indicating that the data representative of the one or more most-interested regions applies to the image.

55. A device for signaling information for video data, the device comprising:
 means for determining one or more most-interested regions of a plurality of regions of an image of video data, the one or more most-interested regions comprising one or more regions that are most likely to be retrieved by a client device;
 means for outputting, to the client device, data representative of the one or more most-interested regions, wherein the data representative of the one or more most-interested regions is included in a bitstream including the video data;
 means for receiving, from the client device, a request for video data for the one or more most-interested regions;

means for outputting, to the client device, after outputting the data representative of the one or more most interested regions, the video data for the one or more most-interested regions;

means for receiving, from the client device, a request for video data for one or more other regions of the image; and means for outputting, to the client device, after outputting the video data for the one or more most-interested regions, the video data for the one or more other regions of the image.

56. A non-transitory computer-readable storage medium having stored thereon instructions that, when executed, cause a processor to:

determine one or more most-interested regions of a plurality of regions of an image of video data, the one or more most-interested regions comprising one or more regions that are most likely to be retrieved by a client device;

output, to the client device, data representative of the one or more most-interested regions, wherein the data representative of the one or more most-interested regions is included in a bitstream including the video data;

receive, from the client device, a request for video data for the one or more most-interested regions;

output, to the client device, after outputting the data representative of the one or more most interested regions, the video data for the one or more most-interested regions;

receive, from the client device, a request for video data for one or more other regions of the image; and output, to the client device, after outputting the video data for the one or more most-interested regions, the video data for the one or more other regions of the image.

* * * * *